US011138442B2

(12) United States Patent
Winter et al.

(10) Patent No.: US 11,138,442 B2
(45) Date of Patent: *Oct. 5, 2021

(54) ROBUST, ADAPTIVE AND EFFICIENT OBJECT DETECTION, CLASSIFICATION AND TRACKING

(71) Applicant: Placemeter Inc., New York, NY (US)

(72) Inventors: Alexandre Winter, New York, NY (US); Ugo Jardonnet, New York, NY (US); Tuan Hue Thi, New York, NY (US); Niklaus Haldimann, New York, NY (US)

(73) Assignee: Placemeter, Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/288,310

(22) Filed: Oct. 7, 2016

(65) Prior Publication Data
US 2017/0068858 A1    Mar. 9, 2017

Related U.S. Application Data

(60) Division of application No. 15/134,245, filed on Apr. 20, 2016, and a continuation-in-part of application
(Continued)

(51) Int. Cl.
*G06K 9/00* (2006.01)
*H04N 7/18* (2006.01)
(Continued)

(52) U.S. Cl.
CPC ..... *G06K 9/00778* (2013.01); *G06K 9/00637* (2013.01); *G06K 9/00651* (2013.01);
(Continued)

(58) Field of Classification Search
CPC ........... G06K 9/00778; G06K 9/00718; G06K 9/00771; G06K 9/00993; G06K 9/4604;
(Continued)

(56) References Cited

U.S. PATENT DOCUMENTS 5,194,908 A    3/1993   Lougheed
6,295,321 B1   9/2001   Lyu
(Continued)

FOREIGN PATENT DOCUMENTS

CN    101489121 A    7/2009
WO    2015/184440 A2   12/2015

OTHER PUBLICATIONS

Makris et al., "Learning Semantic Scene Models From Observing Activity in Visual Surveillance", Jun. 2005, IEEE, Trans, on Systems, Man, and Cybernetics—part B: Cybernetics, vol. 35, No. 3, p. 397-408.*

(Continued)

*Primary Examiner* — Vincent Rudolph
*Assistant Examiner* — Timothy Choi
(74) *Attorney, Agent, or Firm* — Boyle Fredrickson, SC

(57) ABSTRACT

Embodiments of a method and system described herein enable capture of video data streams from multiple, different video data source devices and the processing of the video data streams. The video data streams are merged such that various data protocols can all be processed with the same worker processors on different types of operating systems, which are typically distributed. In an embodiment the multiple video data sources comprises at least one mobile device executing a video sensing application that produces a video data stream for processing by video analysis worker processes. The processes include automatically detecting moving objects in a video data stream, and further tracking and analyzing the moving objects.

14 Claims, 11 Drawing Sheets

Related U.S. Application Data

No. 14/727,321, filed on Jun. 1, 2015, now Pat. No. 10,432,896, and a continuation-in-part of application No. 15/078,611, filed on Mar. 23, 2016, now Pat. No. 10,043,078.

(51) Int. Cl.

| | | |
|---|---|---|
| *G06T 7/215* | (2017.01) | |
| *G06T 7/194* | (2017.01) | |
| *G06T 7/246* | (2017.01) | |
| *G06K 9/34* | (2006.01) | |
| *G06K 9/46* | (2006.01) | |
| *G06K 9/62* | (2006.01) | |
| *G06T 7/12* | (2017.01) | |

(52) U.S. Cl.
 CPC ..... *G06K 9/00718* (2013.01); *G06K 9/00771* (2013.01); *G06K 9/00993* (2013.01); *G06K 9/34* (2013.01); *G06K 9/4604* (2013.01); *G06K 9/627* (2013.01); *G06K 9/6218* (2013.01); *G06K 9/6248* (2013.01); *G06T 7/194* (2017.01); *G06T 7/215* (2017.01); *G06T 7/246* (2017.01); *H04N 7/181* (2013.01); *H04N 7/183* (2013.01); *H04N 7/188* (2013.01); *G06K 9/6267* (2013.01); *G06K 2209/21* (2013.01); *G06T 7/12* (2017.01); *G06T 2207/10024* (2013.01); *G06T 2207/20044* (2013.01); *G06T 2207/30196* (2013.01)

(58) Field of Classification Search
 CPC .. G06K 9/00637; G06K 9/00651; G06K 9/34; G06K 9/6218; G06K 9/627; G06K 9/481; G06K 9/6267; G06K 2209/21; G06T 7/2093; G06T 7/194; G06T 7/246; G06T 7/0081; G06T 7/2033; G06T 5/20; G06T 2207/30241; G06T 2207/10016; G06T 2207/10024; G06T 2207/20044; G06T 2207/20144; H04N 7/181; H04N 7/183; H04N 7/188
 See application file for complete search history.

(56) References Cited

U.S. PATENT DOCUMENTS

| | | |
|---|---|---|
| 6,587,574 B1 | 7/2003 | Jeannin |
| 6,987,883 B2 | 1/2006 | Lipton et al. |
| 6,999,600 B2 | 2/2006 | Venetianer et al. |
| 7,006,128 B2 | 2/2006 | Xie |
| 7,199,798 B1 | 4/2007 | Echigo |
| 7,221,367 B2 | 5/2007 | Cardno |
| 7,224,852 B2 | 5/2007 | Lipton et al. |
| 7,382,244 B1* | 6/2008 | Donovan ......... G08B 13/19645 340/506 |
| 7,391,907 B1 | 6/2008 | Venetianer et al. |
| 7,424,175 B2 | 9/2008 | Lipton et al. |
| 7,574,043 B2 | 8/2009 | Porkili |
| 7,613,322 B2 | 11/2009 | Yin et al. |
| 7,688,349 B2 | 3/2010 | Flickner et al. |
| 7,796,780 B2 | 9/2010 | Lipton et al. |
| 7,801,330 B2 | 9/2010 | Zhang et al. |
| 7,868,912 B2 | 1/2011 | Venetianer et al. |
| 7,932,923 B2 | 4/2011 | Lipton et al. |
| 8,325,036 B1 | 12/2012 | Fuhr |
| 8,331,619 B2 | 12/2012 | Ikenoue |
| 8,340,349 B2 | 12/2012 | Salgian |
| 8,340,654 B2 | 12/2012 | Bratton et al. |
| 8,369,399 B2 | 2/2013 | Egnal et al. |
| 8,401,229 B2 | 3/2013 | Hassan-Shafique et al. |
| 8,457,401 B2 | 6/2013 | Lipton et al. |
| 8,526,678 B2 | 9/2013 | Liu et al. |
| 8,564,661 B2 | 10/2013 | Lipton et al. |
| 8,582,803 B2 | 11/2013 | Ding |
| 8,594,482 B2 | 11/2013 | Fan |
| 8,599,266 B2 | 12/2013 | Trivedi |
| 8,625,905 B2 | 1/2014 | Schmidt |
| 8,649,594 B1 | 2/2014 | Hua |
| 8,654,197 B2 | 2/2014 | Nizko |
| 8,655,016 B2 | 2/2014 | Brown |
| 8,711,217 B2 | 4/2014 | Venetianer et al. |
| 8,823,804 B2 | 9/2014 | Haering et al. |
| 8,948,458 B2 | 2/2015 | Hassan-Shafique et al. |
| 9,213,781 B1* | 12/2015 | Winter ............. G06F 17/30943 |
| 2002/0051057 A1 | 5/2002 | Yata |
| 2002/0124263 A1 | 9/2002 | Yokomizo |
| 2003/0053692 A1 | 3/2003 | Hong |
| 2003/0090751 A1 | 5/2003 | Itokawa |
| 2003/0215110 A1 | 11/2003 | Rhoads |
| 2004/0022227 A1 | 2/2004 | Lynch |
| 2004/0151342 A1 | 8/2004 | Venetianer |
| 2004/0161133 A1 | 8/2004 | Elazar |
| 2005/0002572 A1* | 1/2005 | Saptharishi ............. G06T 7/194 382/224 |
| 2005/0169531 A1 | 8/2005 | Fan |
| 2005/0185058 A1 | 8/2005 | Sablak |
| 2005/0213836 A1* | 9/2005 | Hamilton ................. G06T 9/00 382/251 |
| 2006/0007308 A1 | 1/2006 | Ide |
| 2006/0031291 A1 | 2/2006 | Beckemeyer |
| 2006/0078047 A1* | 4/2006 | Shu ..................... G06F 17/3079 375/240.01 |
| 2006/0095539 A1* | 5/2006 | Renkis ............. G08B 13/19641 709/217 |
| 2006/0198608 A1 | 9/2006 | Girardi |
| 2006/0227862 A1 | 10/2006 | Campbell |
| 2006/0233535 A1 | 10/2006 | Honda |
| 2006/0290779 A1 | 12/2006 | Reverte |
| 2007/0024705 A1 | 2/2007 | Richter |
| 2007/0024706 A1 | 2/2007 | Brannon |
| 2007/0071403 A1 | 3/2007 | Urita |
| 2007/0016345 A1 | 5/2007 | Peterson |
| 2007/0127508 A1 | 6/2007 | Bahr |
| 2007/0127774 A1 | 6/2007 | Zhang |
| 2007/0147690 A1 | 6/2007 | Ishiwata |
| 2007/0177792 A1 | 8/2007 | Ma |
| 2007/0177800 A1* | 8/2007 | Connell ............. G06K 9/00771 382/181 |
| 2008/0030429 A1 | 2/2008 | Hailpern |
| 2008/0123955 A1 | 5/2008 | Yeh |
| 2008/0137950 A1 | 6/2008 | Park |
| 2008/0152122 A1 | 6/2008 | Idan |
| 2008/0263012 A1 | 10/2008 | Jones |
| 2008/0281518 A1 | 11/2008 | Dozier |
| 2008/0316327 A1 | 12/2008 | Steinberg |
| 2008/0316328 A1 | 12/2008 | Steinberg |
| 2009/0033745 A1 | 2/2009 | Yeredor |
| 2009/0034846 A1 | 2/2009 | Senior |
| 2009/0063205 A1 | 3/2009 | Shibasaki |
| 2009/0080864 A1 | 3/2009 | Rajakarunanayake |
| 2009/0103812 A1 | 4/2009 | Diggins |
| 2009/0141939 A1 | 6/2009 | Chambers |
| 2009/0147991 A1 | 6/2009 | Chau |
| 2009/0222388 A1 | 9/2009 | Hua |
| 2009/0268968 A1 | 10/2009 | Milov |
| 2009/0290023 A1 | 11/2009 | Lefort |
| 2010/0014717 A1 | 1/2010 | Rosenkrantz |
| 2010/0142927 A1 | 6/2010 | Lim |
| 2010/0177194 A1 | 7/2010 | Huang |
| 2010/0211304 A1 | 8/2010 | Hwang |
| 2010/0260385 A1 | 10/2010 | Chau |
| 2010/0290710 A1 | 11/2010 | Gagvani |
| 2010/0295999 A1 | 11/2010 | Li |
| 2010/0302346 A1 | 12/2010 | Huang |
| 2011/0007944 A1 | 1/2011 | Atrazhev |
| 2011/0018998 A1 | 1/2011 | Guzik |
| 2011/0125593 A1 | 5/2011 | Wright |
| 2011/0130905 A1 | 6/2011 | Mayer |
| 2011/0141227 A1 | 6/2011 | Bigiol |
| 2011/0152645 A1 | 6/2011 | Hoover |
| 2011/0153645 A1 | 6/2011 | Hoover |

(56) References Cited

U.S. PATENT DOCUMENTS

| | | |
|---|---|---|
| 2011/0184307 A1 | 7/2011 | Hulin |
| 2011/0280547 A1 | 11/2011 | Fan |
| 2011/0310970 A1 | 12/2011 | Lee |
| 2012/0008819 A1 | 1/2012 | Ding |
| 2012/0057640 A1 | 3/2012 | Shi |
| 2012/0075450 A1 | 3/2012 | Ding |
| 2012/0086568 A1 | 4/2012 | Scott |
| 2012/0106782 A1 | 5/2012 | Nathan |
| 2012/0127262 A1 | 5/2012 | Wu |
| 2012/0134535 A1 | 5/2012 | Pai |
| 2012/0179832 A1 | 7/2012 | Dolph |
| 2012/0182392 A1 | 7/2012 | Kearns |
| 2012/0262583 A1 | 10/2012 | Bernal |
| 2012/0304805 A1 | 11/2012 | Kim |
| 2013/0058537 A1 | 3/2013 | Chertok |
| 2013/0086389 A1 | 4/2013 | Suwald |
| 2013/0148848 A1 | 6/2013 | Lee |
| 2013/0166711 A1 | 6/2013 | Wang |
| 2013/0202165 A1 | 8/2013 | Wehnes |
| 2013/0251216 A1 | 9/2013 | Smowton |
| 2014/0003708 A1 | 1/2014 | Datta |
| 2014/0015846 A1 | 1/2014 | Campbell |
| 2014/0036090 A1 | 2/2014 | Black |
| 2014/0046588 A1 | 2/2014 | Maezawa |
| 2014/0052640 A1 | 2/2014 | Pitroda |
| 2014/0129596 A1 | 5/2014 | Howe |
| 2014/0132728 A1 | 5/2014 | Verano |
| 2014/0212002 A1 | 7/2014 | Curcio |
| 2014/0278068 A1 | 9/2014 | Stompolos |
| 2014/0294078 A1 | 10/2014 | Seregin |
| 2014/0307056 A1 | 10/2014 | Collet |
| 2014/0359576 A1 | 12/2014 | Rath |
| 2015/0006263 A1 | 1/2015 | Heier |
| 2015/0046127 A1 | 2/2015 | Chen |
| 2015/0070506 A1 | 3/2015 | Chattapadhyay |
| 2015/0077218 A1 | 3/2015 | Chakkaew |
| 2015/0138332 A1 | 5/2015 | Cheng |
| 2015/0227774 A1 | 8/2015 | Balch |
| 2015/0339532 A1 | 11/2015 | Sharma |
| 2015/0348398 A1 | 12/2015 | Williamson |
| 2015/0350608 A1 | 12/2015 | Winter |
| 2016/0012465 A1 | 1/2016 | Sharp |
| 2016/0019427 A1 | 1/2016 | Martin |
| 2016/0088222 A1 | 3/2016 | Jenny |
| 2016/0314353 A1* | 10/2016 | Winter ............... G06K 9/00744 |
| 2016/0334927 A1 | 11/2016 | Kim |
| 2017/0068858 A1 | 3/2017 | Winter |
| 2017/0070707 A1* | 3/2017 | Winter ................... H04N 7/188 |
| 2017/0277956 A1* | 9/2017 | Winter ............... G06K 9/00718 |
| 2017/0277959 A1* | 9/2017 | Winter ............... G06K 9/00778 |
| 2018/0046315 A1 | 2/2018 | Kim |
| 2018/0165813 A1 | 6/2018 | Mai |

OTHER PUBLICATIONS

Estevez-Ayres et al., "Using Android Smartphones in a Service-Oriented Video Surveillance System", Jan. 2011, IEEE Int. Conf. on Consumer Electronics, 2011, p. 887-888.*

Parameswaran et al. "Design and Validation of a System for People Queue Statistics Estimation", Jan. 2012, Springer, Video Analytics for Business Intelligence, p. 355-373.*

Xu et al., "Partial Observation vs. Blind Tracking through Occlusion", Jan. 2003, British Machine Vision Conference (BMVC 2002), p. 777-786.*

Foresti et al., "Event Classification for Automatic Visual-based Surveillance of Parking Lots", Aug. 2004, IEEE, Proceedings of the 17th Int. Conf. on Pattern Recognition, p. 1-4.*

Yang et al., "Multi-Target Tracking by Online Learning of Non-Linear Motion Patterns and Robust Appearance Models", Jun. 2012, IEEE, 2012 IEEE Conf. on Computer Vision and Pattern Recognition, p. 1918-1925.*

Magee, "Tracking multiple vehicle using foreground, background and motion models", Feb. 2004, Elsevier, Image and Vision Computing, vol. 22, iss. 2, p. 143-155.*

Stauffer et al., "Adaptive background mixture models for real-time tracking", Jun. 1999, IEEE, 1999 IEEE Computer Society Conference on Computer Vision and Pattern Recognition Proceedings, p. 246-252.*

Amended Claims of Related U.S. Appl. No. 15/288,085, submitted Jun. 13, 2018.*

Amended Claims of Related U.S. Appl. No. 15/288,224, submitted May 9, 2018.*

Borges, "Pedestrian Detection Based on Blob Motion Statistics", Feb. 2013, IEEE, IEEE Trans. on Circuits and Systems for Video Technology, vol. 23, No. 2, p. 224-235. (Year: 2013).*

Miller, "Supervised Learning and Bayesian Classification", Sep. 2011, University of Massachusets Amherst, CS370: Introduction to Computer Vision (<https://people.cs.umass.edu/~elm/Teaching/370_S11/>), <https://people.cs.umass.edu/~elm/Teaching/Docs/supervised.pdf>, p. 1-8. (Year: 2011).*

Lefloch et al., "Real-time people counting system using a single video camera", Feb. 2008, Proc. Real-Time Image Processing 2008, vol. 6811, p. 681109-1-681109-12. (Year: 2008).*

Wang et al., "A Novel Robust Statistical Method for Background Initialization and Visual Surveillance", 2006, Springer, Computer Vision—ACCV 2006, LNCS 3851, p. 328-337. (Year: 2006).*

Xia et al., "A modified Gaussian mixture background model via spatiotemporal distribution with shadow detection", Jan. 2015, Springer, Signal, Image and Video Processing, vol. 10, p. 343-350. (Year: 2015).*

Barnich et al., "VIBE: A Powerful Random Technique To Estimate the Background in Video Sequences", Apr. 2009, 2009 IEEE International Conference on Acoustics, Speech and Signal Processing, p. 945-948. (Year: 2009).*

H.. Bannour, L. Hlaoua and B. Ayes, Survey of the Adequate Descriptor for Content-Based Image Retrieval on the Web: Global versus Local Features, Department of Information Sciences.

E. Baudrier, G. Millon, F. Nicolier and S. Ruan, A Fast Binary-Image Comparison Method with Local-dissimilarity Quantification, Labratory Crestic, Troyes Cedex, France.

D. Lisin, M. Mattar, M. Blaschko, M. Benfield and E. Learned-Miller, Combining Local and Global Image Features for Object Class Recognition, Computer Vision Lab, Department of Computer Science, University of Massachusetts.

L. Paninski, Estimation of Entropy andMutual Information, Center for Neural Science, New York University, New York, NY 10003, U.S.A., accepted Nov. 27, 2002.

Machado, D. People Counting Sytem using Existing Surveillance Video Camera: Nov. 2011, pp. 1-71.

Terada, K. "A method of counting the passing people by using the stereo images" Image Processing, 1999, ICIP 99. Proceedings. 1999 International Conference, pp. 1-5.

International Search Report and Written Opinion in PCT/US16/28511.

International Search Report and Written Opinion in PCT/US16/28516.

Machado, D., "People Counting System Using Existing Surveillance Video Camera" Nov. 2011, pp. 1-71.

Lefloch, D., "Real-Time People Counting System Using Video Camera" Master of Computer Science, Image and Artificial Intelligence 2007 at UFR Sciences et Technique, pp. 1-5.

Terada, K., "A Method of Counting the Passing People by Using the Stereo Images" Image Processing, 1999, ICIP 99. Proceedings. 1999 International Confenerence, pp. 1-5.

Bannour, H.,, et al., "Survey of the Adequate Descriptor for Content-Based Image Retrieval on the Web" Global versus Local Features, Department of Information Sciences.

Lisin, D. et al., "Combining Local and Global Image Features for Object Class Recognition" Computer Vision Lab, Department of Computer Science, University of Massachusetts.

Paninski, L., "Estimation of Entropy and Mutual Information" Center for Neural Science, New York University, New York, NY 10003, USA, Received Jun. 3, 2002; Accepted Nov. 27, 2002.

(56) References Cited

OTHER PUBLICATIONS

Parameswaran et al., "Design and Validation of a System for People Queue Statistics Estimation", Jan. 2012, Springer, Video Analytics for Business Intelligence, ;. 355-373.
Magee, "Tracking Multiple Vehicle Using Foreground, Background and Motion Models", Feb. 2004, Elsevier, Image and Vision Computing, vol. 22, issue 2, p. 143-155.
Morris et al., "A Survey of Vision-Based Trajectory Learning and Analysis for Surveillance", Aug. 2008, IEEE, IEEE Transactions on Circuits and Systems for Video Technology, vol. 18, No. 8, p. 1114-1127.
Virtual Turnstile | Security Systems Technology | www.sstgroup.co.uk/solutions/access-control/virtual-turnstile pp. 1-2.
Placemeter Inc., PCT/US2015/033499 Application, "Notification of Transmittal of the International Search Report and the Written Opinion", dated Oct. 28, 2015.
Placemeter Inc., PCT/US2016/025816 Application, "Notification Concerning Transmittal of International Preliminary Report on Patentability", dated Nov. 2, 2017.
Placemeter Inc., PCT/US2016/025816 Application, "Notification of Transmittal of the International Search Report and the Written Opinion", dated Jul. 11, 201.
Placemeter Inc., PCT/US2016/028511 Application, "Notification Concerning Transmittal of International Preliminary Report on Patentability", dated Nov. 2, 2017.
Placemeter Inc., PCT/US2016/028511 Application, "Notification of Transmittal of the International Search Report and the Written Opinion", dated Sep. 14, 2016.
Placemeter Inc., EP 15798996.3 Application, "Communication Pursuant to Rule 164(1) EPC—Partial Supplementary European Search Report", dated Nov. 27, 2017.
Placemeter Inc., EP 15798996.3 Application, "Communication—Extended European Search Report", dated Feb. 6, 2018.
Baudrier, E., et al., "A Fast Binary-Image Comparison Method with Local-Dissimilarity Quantification", Laboratory Crestic, Troyes Cedex, France.
Almomani, R., et al., "Segtrack: A Novel Tracking System with Improved Object Segmentation", IEEE 2013, Wayne State University, Department of Computer Science, Detroit, MI 48202, ICIP 2013, p. 3939-3943.
Lucas, B., et al., "An Iterative Image Registration Technique with an Application to Stereo Vision", Proceedings of Imaging Understanding Workshop 1981, Computer Science Department, Carnegie-Mellon University, p. 121-130.
Russakoff, D., et al., "Image Similarity Using Mutual Information of Regions", Dept. of Computer Science, Stanford University, ECCV 2004, LNCS 3023, Springer-Verlag, Berlin Heidelberg 2004, pp. 596-607.
Shi, J., et al., "Good Features to Track", IEEE Conference on Computer Vision and Pattern Recognition (CVPR94), Seattle, Jun. 1994.
Studholme, C., et al., "An Overlap Invariant Entropy Measure of 3D Medical Image Alignment", 1999 Pattern Recognition Society, Published by Elsevier Sciences Ltd., Pattern Recognition 31 (1999), p. 71-86.
Viola, P., et al., "Robuts Real-Time Face Detection", 2004 International Journal of Computer Vision 57(2), Kluwer Academic Publishers, Netherlands, p. 137-154.
"Virtual Turnstile" Security Systems Technology Ltd 2008 pp. 1-2.
Franconeri et al., "A simple proximity heuristic allows tracking of multiple objects through occlusion", Jan 2012, Psychonomic Society, Attention, Perception & Psychophysics, vol. 74, issue 4, pp. 691-702 (Year 2012).
Stephen et al., "A visual tracking system for the measurement of dynamic structural displacements", Aug. 1991, Wiley, Concurrency and Computation: Practice and Experience, vol. 3, issue 4, pp. 357-366 (Year 1991).
Ming Xu et al.; "Illumination-Invariant Motion Detection Using Colour Mixture Models"; Department of Electrical, Electronic and Information Engineering; City University, London EC1V OHB; EPSRC under grant No. GR/M58030; BMVC 2001 doi:10.5244/C.15.18; pp. 163-172.
Zakir Hussain et al.; "Moving Object Detection Bsaed on Background Subtraction & Frame Differencing Technique"; IJARCCE—International Journal of Advanced Research in Computer and Communication Engineering; vol. 5, Issue 5, May 2016; pp. 817-819—(3) pages.

\* cited by examiner

ROBUST, ADAPTIVE AND EFFICIENT OBJECT DETECTION, CLASSIFICATION AND TRACKING

RELATED APPLICATIONS

This application is a divisional application of U.S. patent application Ser. No. 15/134,245, filed Apr. 20, 2016. U.S. patent application Ser. No. 15/134,245 claims priority from the following U.S. Provisional Applications: No. 62/150,623, filed Apr. 21, 2015; 62/150,629, filed Apr. 21, 2015; 62/150,646, filed Apr. 21, 2015; 62/150,654, filed Apr. 21, 2015; 62/150,667, filed Apr. 21, 2015; and 62/150,692, filed Apr. 21, 2015. This application is also a continuation-in-part of U.S. patent application Ser. No. 14/727,321, filed Jun. 1, 2015 and a continuation-in-part of U.S. patent application Ser. No. 15/078,611, filed Mar. 23, 2016.

FIELD OF THE INVENTION

Embodiments disclosed herein are in the field of video data processing, in particular object detection and pattern recognition.

BACKGROUND

Various techniques exist for processing digital video data for purposes of image recognition, pattern recognition, object detection, etc. Typically, video data is captured by one type of processing device and then analyzed by that device or by another type of processing device which has received the captured data. For example, one method includes acquiring visual image primitives from a video input comprising visual information relevant to a human activity. The primitives are temporally aligned to an optimally hypothesized sequence of primitives transformed from a sequence of transactions as a function of a distance metric between the observed primitive sequence and the transformed primitive sequence. Another method detects a moving target with the use of a reference image and an inspection image from the images captured by one or more cameras. A moving target is detected from the reference image and the inspection image based on the orientation of corresponding portions in the reference image and the inspection image relative to a location of an epipolar direction common to the reference image and the inspection image; and displays any detected moving target on a display.

Current video data processing techniques typically operate on one type of video input data. Making available a larger source of data aggregated from multiple sources into a combined source has not been possible for individual contributors.

In addition, it has proven challenging to process large amounts of streaming video data effectively.

It would be desirable to have a system and method for receiving digital video data from multiple sources of different types and be able to analyze the raw data as a single data source from the different sources to determine facts about a scene both at a point in time and over a period of time.

DETAILED DESCRIPTION

Figure 1:
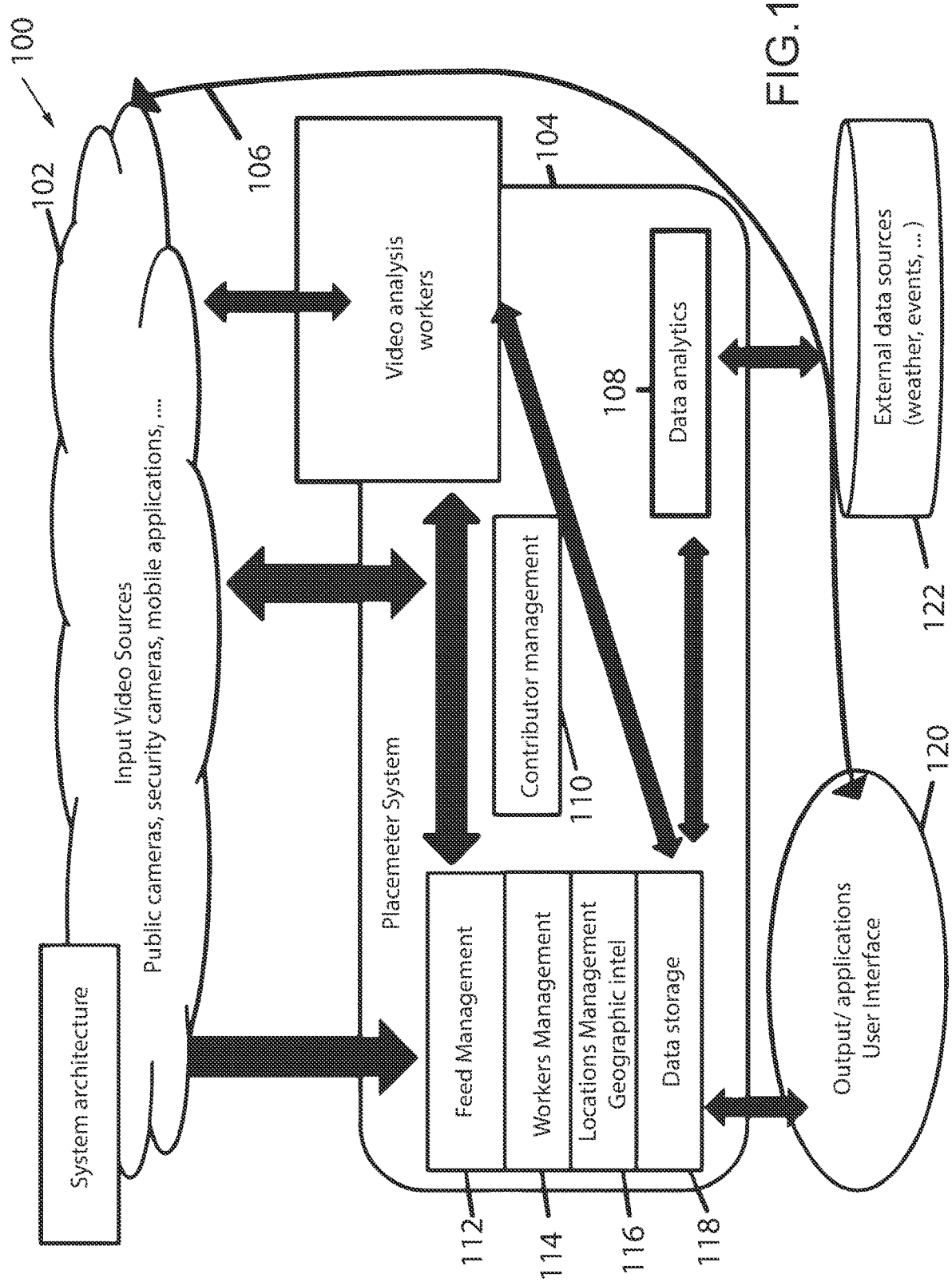
FIG. 1 is a block diagram of an activity monitoring and video processing system according to an embodiment.

Embodiments described herein include a system and method for video data processing. Video data from multiple streaming sources is processed in order to determine the status of various aspects of environments. The video data processing system uses video streams to measure activity levels in the physical world. This provides information that enables people and businesses to interact more effectively and efficiently with physical locations and cities.

In an embodiment, the video data processing system uses input video streams from a variety of sources. Sources include existing video feeds such as security cameras, video feeds contributed by system users through old smartphones placed in a fixed location simple webcams, or embedded sensors that contain a video feed and some video analysis software. The system includes a backend subsystem consisting of specially programmed processors executing software that manages video feeds, processes the video feeds into data, stores the data, and computes analytics and predictions.

Embodiments facilitate the processing and analysis of any possible video source, whatever its type or support. These sources include: existing public video cameras in the form of standard video streams; existing public video feeds in the form of .jpg files regularly updated on a website; simple webcams; security cameras installed for security purposes but whose feeds can be ingested by the video data processing system to extract data; video streams or files coming from old cell phones that run a video sensing application specific to the video data processing system. The sensing application can either produce actual video streams or encore video files, and pushes them on a hosted storage server such as FTP server or Amazon S3 server. Using a smartphone as a video sensor, a capture device is configured to stream data out through files. This solves a major problem of setting cameras and exporting their feeds to a different network location on the internet.

The system thus provides a unified framework to intake video frames coming from these various described sources, and to unify their geolocation and time reference so as to be able to compare any geolocated or time stamped data extracted from them.

In an embodiment using a smart phone, consecutive video files on the smartphone are encoded, time stamped, and pushed to an FTP server to produce a stable stream of video content without having to have a video streaming server in the loop, but rather a simple file server.

These video feeds are produced by multiple types of entities, including: companies or entities that own video feeds, and provide them for free—e.g. the DOT in New York; companies or entities (e.g. retailers) that own video feeds, and provide them to the video data processing system in exchange for having them transformed into valuable data; companies or organizations that are paid for access to the video feeds they own and operate—e.g. earthcam; companies with whom there is no monetary exchange, e.g. they provide their feed, in exchange for a minimal amount of data for free; and individual contributors who use old smart phones or contribute old cell phones which are hung on windows or wall surface. By running the sensing application on these old phones, new video data processing system video feeds are created.

Compiling video data from many different sources to create data insights and analytics has more scaling network effect than all single data sources combined. This is made possible in part by aggregating data from multiple sources (including individual contributors) into a combined, stable source.

Embodiments include various video algorithms dedicated to transforming a video signal into data and measurements. Embodiments further include data algorithms that combine measurements from video feeds with lower resolution activity maps, weather information, and local event data, to infer place activity in space and time. An output interface includes tools to turn the data extracted from videos into human readable information and useful actions.

FIG. 1 is a block diagram of a video data processing system architecture 100 according to an embodiment. Input video sources 102 can include public cameras, security cameras, mobile applications, and any other device capable of capturing digital video streams. This includes a proprietary protocol to do continuous streaming over long periods of time. A feedback loop is used to reconstruct data, and to identify and solve bandwidth issues.

The input video sources 102 are very varied in nature and quality as previously described. A backend subsystem 104 receives video data streams from the input video sources 102. Feed management module 112 receives the video data streams. Other management modules include a worker management module 114, a locations management and geographic intelligence module 116, and a data storage module 118. As used herein, "worker" implies one or more servers and one or more processors for processing data. Workers can be distributed geographically, and processing tasks may be distributed among workers in any fashion. Data storage module 118 is shown as a single module existing in backend 104. However, actual data storage can be, and typically is, distributed anywhere over the internet. Data storage module 118 is thus a data management module and possibly actual data storage, but not all data will be stored locally.

Input video sources 102 also communicate with a contributor management module 110. Contributor management module 110 oversees and tracks the various input video sources, including their locations and "owners". In some instances, individual owners are paid for making their video data available to the system. Video analysis workers 106 represent multiple special purpose processors tasked with executing video analysis worker processes as further described below. Analyzed video data is stored by data storage manager 118, and also further analyzed by data analytics module 108 as further described below. Data analytics module 108 represents special purpose processors executing data analytics processes. Data analytics module 108 further has access to external data sources 122, which provide data such as weather information, event information related to a location of the video data, etc. Data analytics module 108 may combine external data with the output of the video analysis workers 106 to produce more meaningful output data that is stored by data storage management 118 and output to user interface and user applications 120. User interface and applications 120 make processed video data available to users in a highly accessible form. User interface 120 is available in various embodiments on any computing device with processing capability, communication capability, and display capability, including personal computers and mobile devices.

In an embodiment, backend 104 is a multi-layered system whose roles include: registering all existing video streams and their sources; if the source is a contributor, storing availability and contact information to provide data or to pay them, based on the availability of their sensors; managing "worker" processes that process all video feeds in a different subsystem, and will report data to backend 104; gathering and storing data extracted from video streams; consolidating and merging all data from various sources (e.g., video measurements, weather APIs); packaging and serving data for applications or as an output of backend 104; and architecturally removing the dependency of the video algorithm processor on the various sources of data.

Figure 1A:
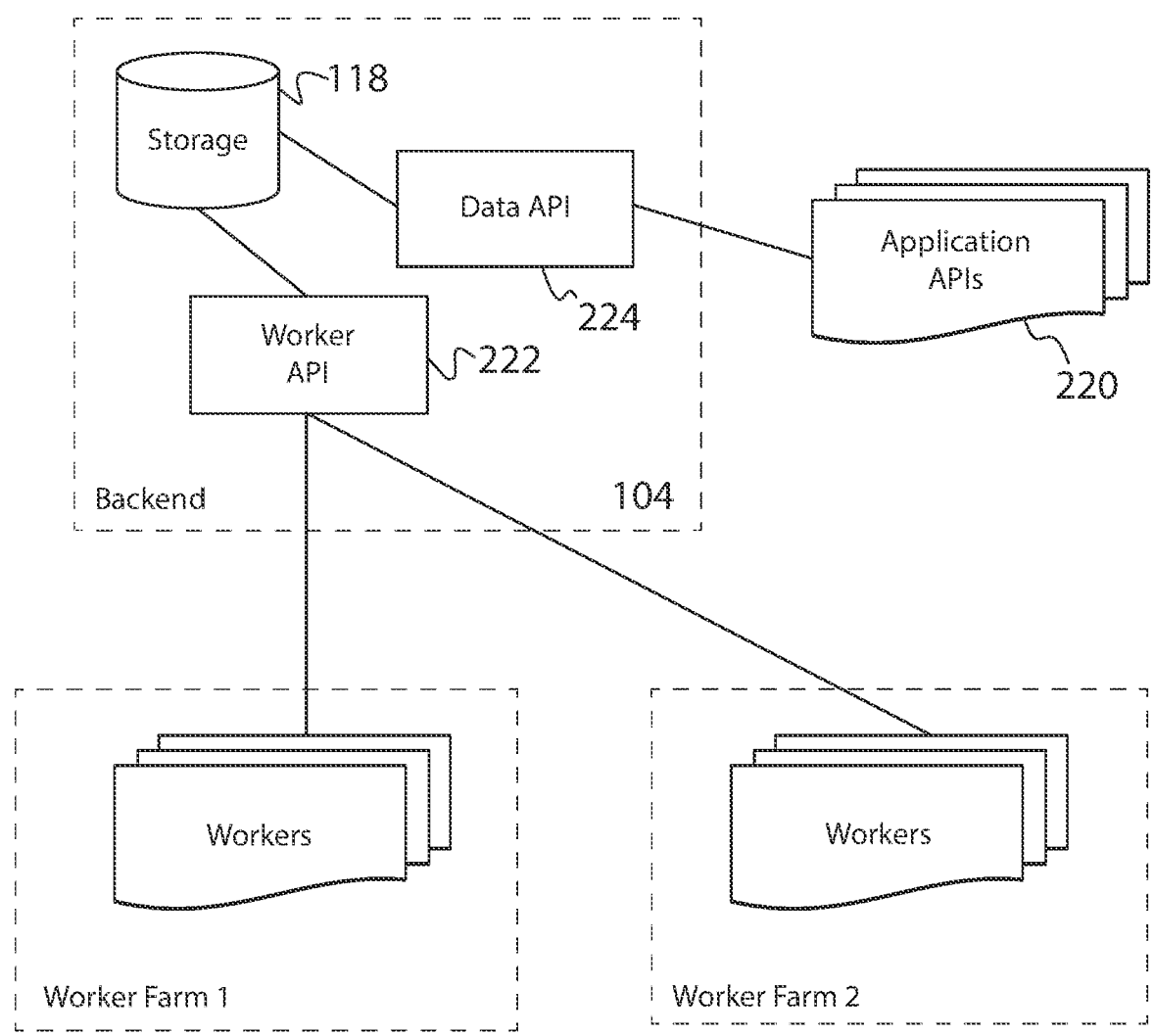
FIG. 1A is a block diagram of an activity monitoring and video processing system according to an embodiment.

According to one aspect of backend 104, it serves to coordinate the distribution of all input sources and worker processes over different types of networks and environments. FIG. 1A is a block diagram illustrating this concept. A worker application programming interface (API) 222 is defined for worker processes running on worker farms such as worker farm 1 and worker farm 2. Worker processes are software processes that can run on any operating system such as Linux, Mac OS or Windows with sufficient random access memory (RAM) and central processing unit (CPU) power to register with backend 104 over a Wide Area Network (WAN), assign individual video feeds with corresponding algorithm parameters and specifications, and then start processing that feed and reporting output data back to the same API 220 endpoint family. These worker processes also report on their level of activity, CPU and RAM occupancy, as well as availability. Thus the video data processing system can instantiate worker processes in many varied environments, leveraging available platforms that can contribute CPU power.

Various applications APIs 220 can be used to allow various applications to communicate data to data APIs 224.

The video data processing system executes various video algorithms and various data algorithms. In an embodiment, the video algorithms are based on a layered stack of algorithms. In an embodiment, these algorithmic layers are based on the assumption that video feeds have a static viewpoint and an average frame rate greater than 0.2 frames per seconds, but embodiments are not so limited.

Figure 1B:
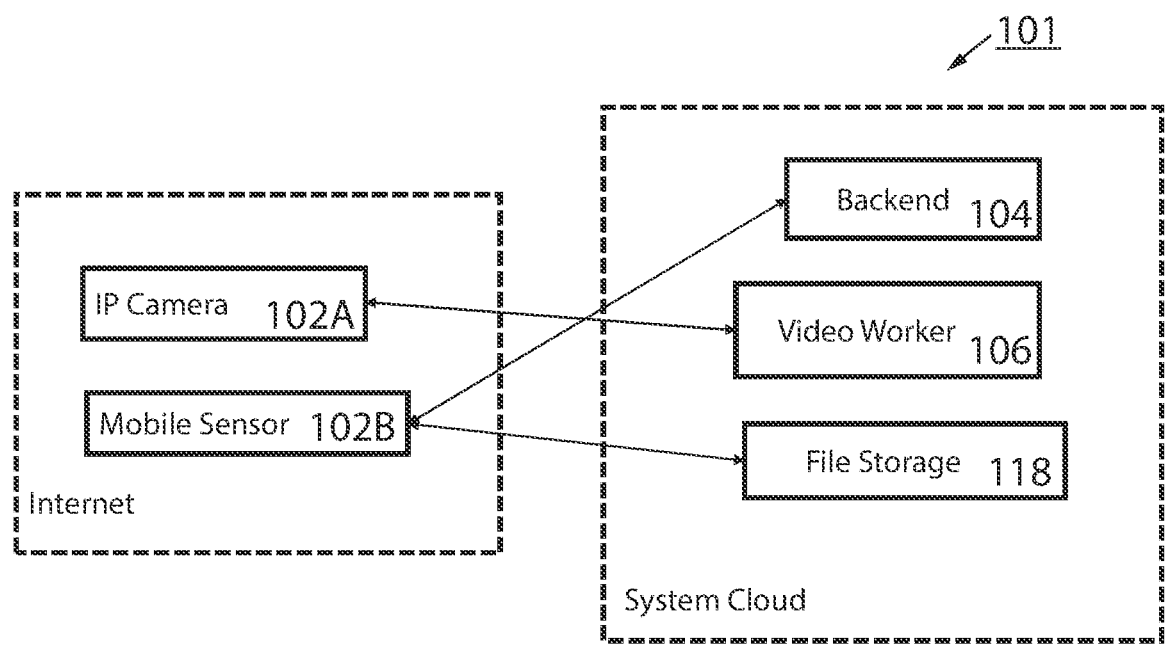
FIG. 1B is a block diagram of an activity monitoring and video processing system according to an embodiment.

FIG. 1B is an alternative illustration of a system embodiment 101 illustrating the processing of video streams. Two main types of video data sources are IP camera 102A and mobile sensor 102B. Although 102A and 102B are listed as singular in the figure, there are typically multiple IP cameras 102A and mobile sensors 102B. IP cameras installed by customers that export a video stream (usually an RTSP stream) to the Internet. A video worker 106 can consume these directly over the Internet via standard video protocols such as RTSP. For mobile sensors 102B, embodiments of the system include mobile apps for iOS and Android (not shown) that stream video using a proprietary protocol.

There is no solution today to continuously send video from a mobile phone to a server over long periods of time—think months, 24/7. Video streaming from mobile apps poses several challenges. Video streaming libraries for the iOS and Android are of poor quality, badly supported and/or unreliable, especially for purposes of the current embodiment where it is intended to stream 24/7. With video streaming libraries one can publish a stream from a mobile app, but this stream needs to be captured by a streaming server and restreamed for consumption (e.g., by a video worker). A streaming server is a complex piece of infrastructure to maintain and non-trivial to scale.

A protocol according to an embodiment addresses these issues. The mobile app continuously captures video clip files of a given length L from its camera. The timestamp T at which the clip was captured is embedded in the file metadata. When a video clip is ready it is uploaded directly to dedicated file storage in the cloud (many easily scalable distributed solutions are available for this kind of storage). A video worker that is processing a mobile app stream, polls the file storage or the latest video clips. It downloads the latest clip, processes the video in it, using frame timestamps derived from the embedded timestamp T. When it is done it cleans up file storage and keeps polling until the next clip is available. A video worker will consider a stream broken if after a given amount of time polling file storage no new clip arrived. When we detect missing data or files, we remotely command the mobile application to reduce video bitrate if possible.

This results in a loss-less video streaming protocol that is not entirely real-time (clips are processed at least with a delay of L). For our use case this delay in real-time processing is acceptable, as long as we can reconstruct the timestamp of any given clip or frame.

Video Algorithms

Moving object detection is a layer is that detects moving objects or moving parts in the image. It is based on estimating the background image of a fixed video stream, by modeling each point using a Gaussian distribution of values on each channel of a color image, or the amplitude of the combined channels. Each pixel is then modeled as: Gaussian distributions for all channels of the color image; a Gaussian distribution for the pixel luminance expressed as a linear combination of the three color channels.

Such a model is created and stored in memory for each coordinate point of an image. As new frames arrive in the system, the Gaussian model estimation is updated with the new values of each pixel at the same coordinate by storing the sum S of the pixel values over time, and the sum T of squared values. Given the total number of observations is N, the average and standard deviation of the Gaussian model can then be evaluated as $S/N$ for the mean value and $(2S-S*S)/N$ for the square value of the standard deviation.

In order to adjust the Gaussian values to potential changes in the mean and standard deviation, these values are computed on moving time windows. In order to reduce the complexity of computing all values over a moving averages, a half distance overlapping scheme is used. If M is the minimum window size (number of samples) over which mean and standard deviation is to be estimated, two sets of overlapping sums and square sums are constantly stored: the current sum set and the future sum set. Each set has the number of samples and the sum of values and the sum of square values. When the first set reaches M samples, the second set is reset, and then updated with each new frame. When the first set reaches M*2 samples, the future set reaches M samples. The future set values are then copied into the current set values, and the future set is reset. This way, at any point in time after M first samples, the estimation of the Gaussian model always has more than M samples, and it is adjusted over time windows of M*2 samples. M is typically set to values ranging from 10 to 1000 depending on applications and video frame rates.

Once a new frame comes in, for each pixel location in an image, it is first assessed whether the current value is part of the background or not. To do so, the normalized distance of the current pixel values is computed for each color channel with the background mean values for each channel. The normalized distance is the distance of the current point to the closest mean adjusted with the standard deviation for the background images. This distance is then normalized towards the amplitude of each channel or the average of all channels. The raw distance calculated from above is divided by a uniform factor of the average values.

If this normalized distance is greater than a predefined threshold, the pixel is classified as a foreground pixel and assigned to the moving objects. If not, the pixel is deemed as part of the background, it is not assigned to the front end masks but used to update the current background models.

At any point in time, the algorithm assumes that there could be a rapid change in background, so it maintains a candidate background point. That point is either updated or created for each point detected as a foreground point.

If the image is too large, the image can be subsampled by an integer factor to evaluate a lower resolution version of the background. Also, the background statistics can be updated only once every n frames. This is very efficient to make the algorithm real time whatever the dimension or frame rate of a video. The CPU occupancy of such a process is controlled and defined with these two parameters. This is a unique way to linearly adjust algorithm reactivity and accuracy based on available or desired computation power.

The object classification layer classifies moving foreground objects (described with reference to the previous layer) into classes of known objects or "noise". In one embodiment, a customized version of the Haar Pyramid approach is used here. Once all moving objects have been detected, they are classified using a classic supervised learning approach, based on the Haar-like feature Cascade classification (as described in P. A. Viola, M. J. Jones: Robust Real-Time Face Detection. ICCV 2001).

According to embodiments, the system is trained and tested, and the algorithms run only on moving objects, thereby reducing the possibilities and variety of the training and input sets of images. In short the classification scheme only needs to recognize moving urban objects from each other, as opposed to recognizing one type of object from any other possible matrix of pixels.

A tracking layer detects the trajectory of one given object over time. The system uses a novel approach based on a holistic model of the trajectories in the image based on existing known foreground objects or newly emerged objects.

An analysis layer uses the type and trajectory information to detect higher level, human readable data such as vehicle or pedestrian speed, and people entering or exiting a location. Inferences can also be drawn based on building layouts, vehicle traffic flows, and pedestrian traffic flows.

Data Algorithms: Line Analysis

Embodiments also include data algorithms that perform specific tasks based on the data obtained from the main stack of video algorithms above. As an example of a data algorithm, line analysis will be described in detail below.

Figure 2:
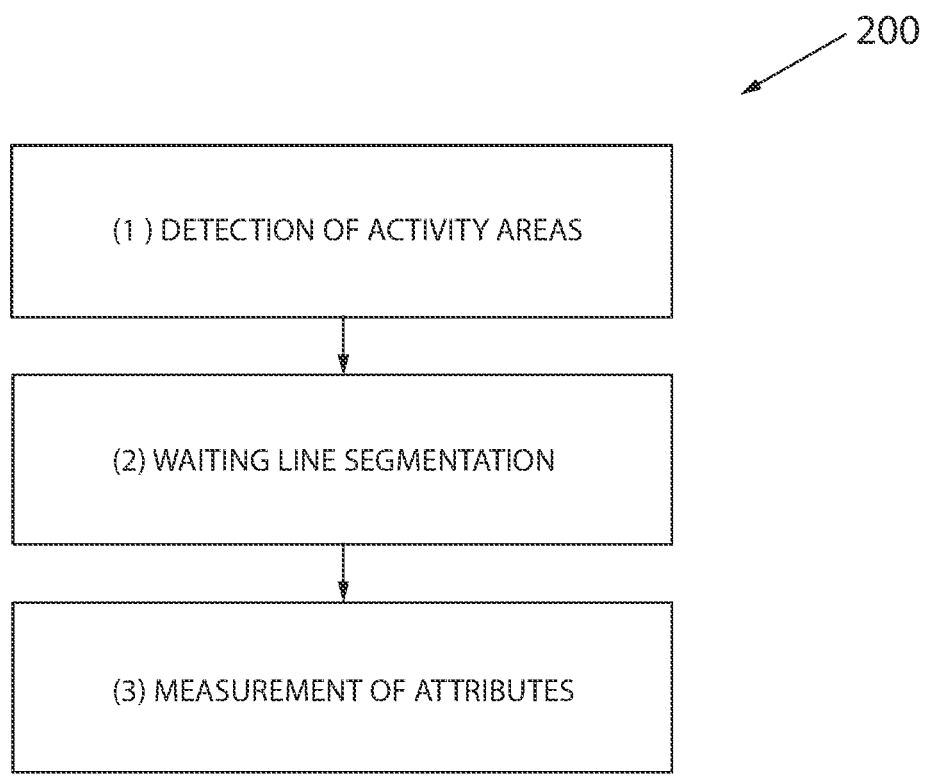
FIG. 2 is a flow diagram illustrating one video processing algorithm according to an embodiment.

Line analysis is a data algorithm that uses a video of a line to detect how many people wait in line and how long it takes them to go through the whole line. Embodiments analyze a waiting line in real time video sequences. The goal of the algorithm is the estimation of line attributes in real time that can be useful for somebody in the process of deciding whether to join the line. For example, estimations for the number of people that currently wait in the line and for the current wait time are extracted. The current wait time is an approximation of the time that a person will have to wait in the line if she joins it in this moment. With reference to FIG. 2, analysis 200 of one embodiment is shown. The analysis 200 has three processes that are repeated for every new captured video frame: 1) detection of activity areas; 2) waiting line segmentation; and 3) measurement of attributes.

Figure 3:
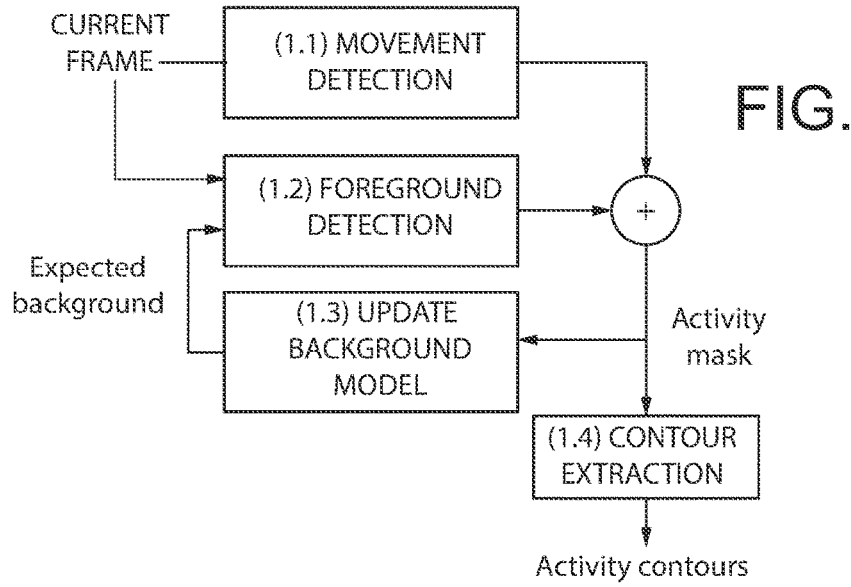
FIG. 3 is a flow diagram showing more detail of detection of activity areas from video data according to an embodiment.
Figure 3:
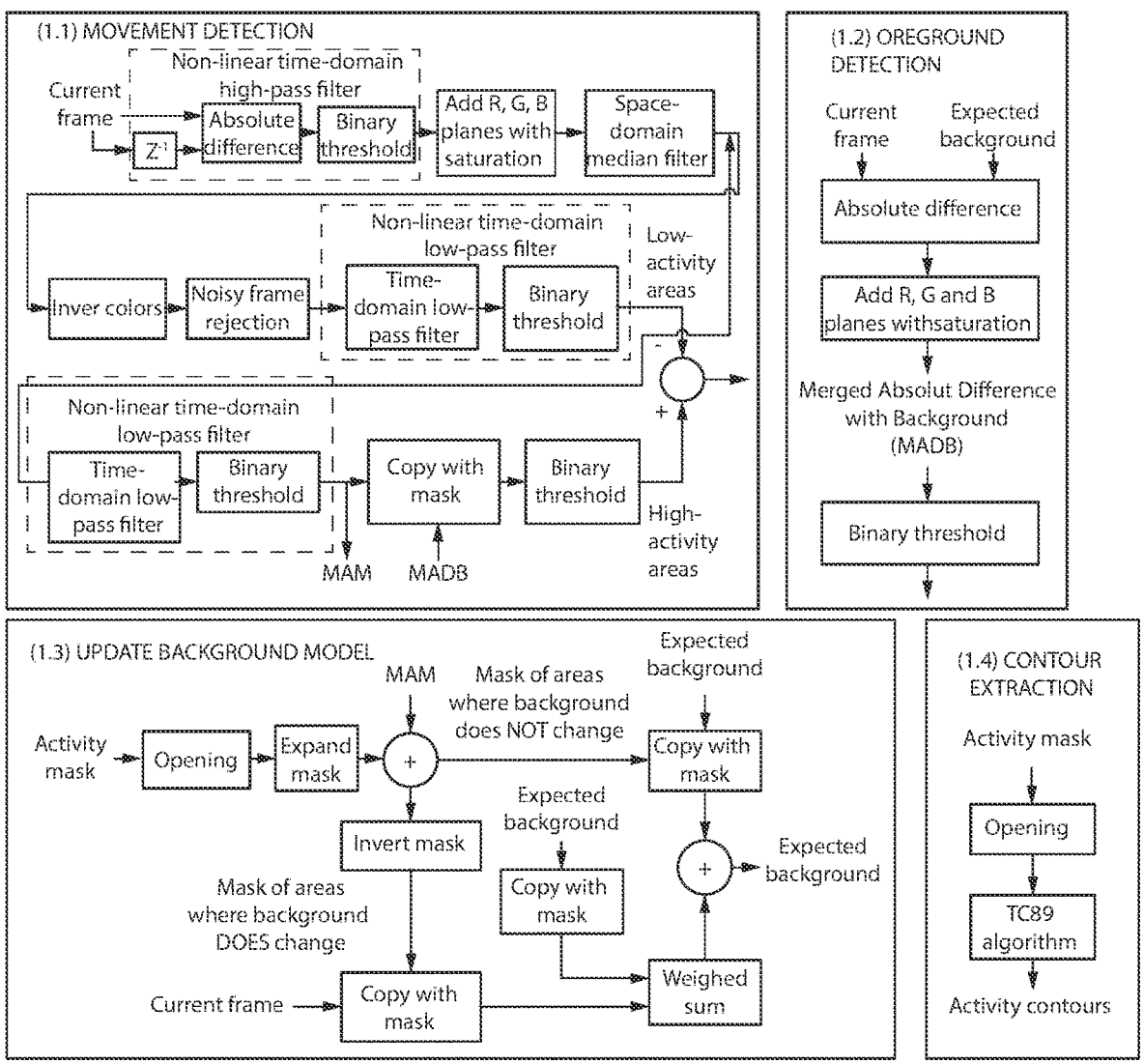

With reference to FIG. 3, the first step detects those areas in the video sequence that have potential human activity. This step is done using the previously described moving foreground detection. The current frame is the input being run through the process (1.1) movement detection and process (1.2) foreground detection. The output of those processes in one instance are combined creating an activity mask and are run through the (1.1) contour extraction process. The output of this is the activity contours, which essentially model a waiting line from the input video data. The output of process (1.1) and (1.2) in another instance is run through the process (1.3) update background model. The expected background is generated and that is passed back through process (1.2) foreground detection.

Process (1.1) works specifically by starting with the current frame input. The current frame input is run through a non-linear time-domain high-pass filter which contains processes $Z^{\wedge}(-1)$, absolute difference and binary threshold. After being run through the non-linear time-domain high-pass filter R, G, B planes with saturation are added. The output of this is run through the space-domain median filter. Once filtered the output is run through either of two routes. In one instance the output is run through a non-linear time-domain low-pass filter which does a time-domain low-pass filter and binary threshold. After running through the filter a copy with the mask is made and the binary threshold is found. The output of this is considered a high activity area and is added to the low activity areas produced by the other instance. In the other instance the output from the space-domain filter has the colors inverted and noisy frames rejected before running through the same linear time-domain low-pass filter described above. The output of this is the low-activity areas. The low-activity area is subtracted from the high activity area to return the area with movement.

Process (1.2) starts with the inputs current frame and expected background. The absolute difference of the current frame and the expected background is found and then R, G, B planes with saturation are added. The absolute difference is then merged with Background (MADB) and the binary threshold of that is found.

Process (1.3) works specifically by starting with an activity mask as the input. The activity mask is sent through an opening process and then the mask is expanded. The MAM is introduced to the output of that process and the mask areas where background does not change are sent to be copied and combined with the expected background. After the MAM is introduced the process will also invert the mask and take the areas where the background does change to make a copy of the current frame using these mask areas. It also will take a copy of that mask and combine it with the expected background. The weighed sum of these copies is found and combined with the masked copy of unchanged background.

Process (1.4) contour extraction starts with the input activity mask. An opening is applied on the activity mask and the output is run through the TC89 algorithm to return the activity contours.

Figure 4:
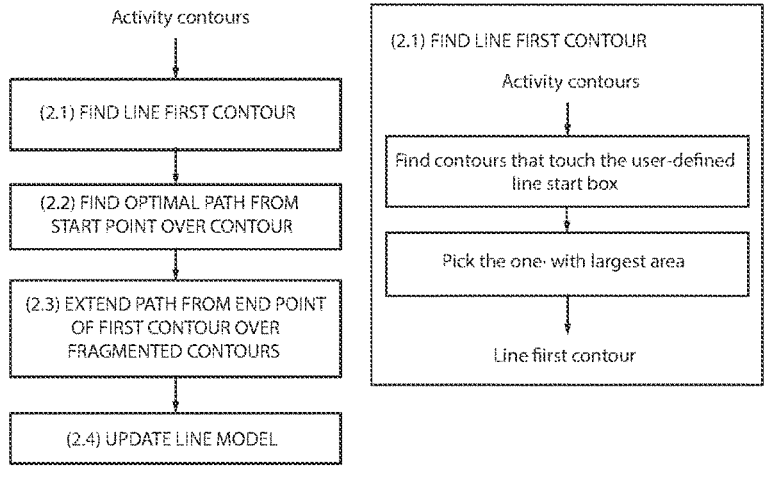
FIG. 4 is a flow diagram showing more detail of deriving waiting line segmentation from video data according to an embodiment.
Figure 4:
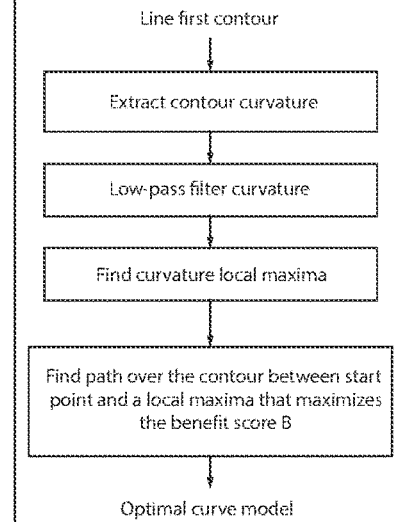
Figure 4:
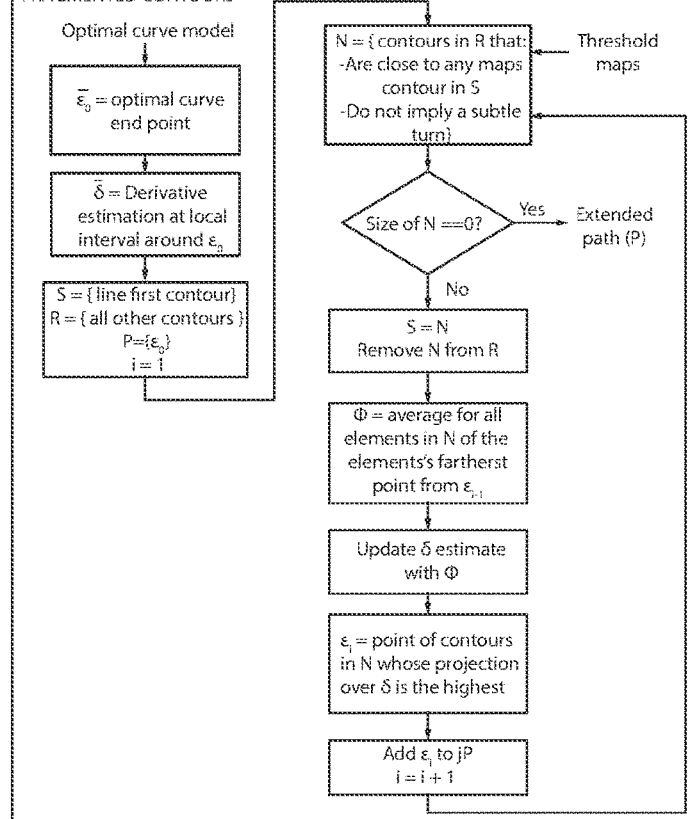
Figure 4:
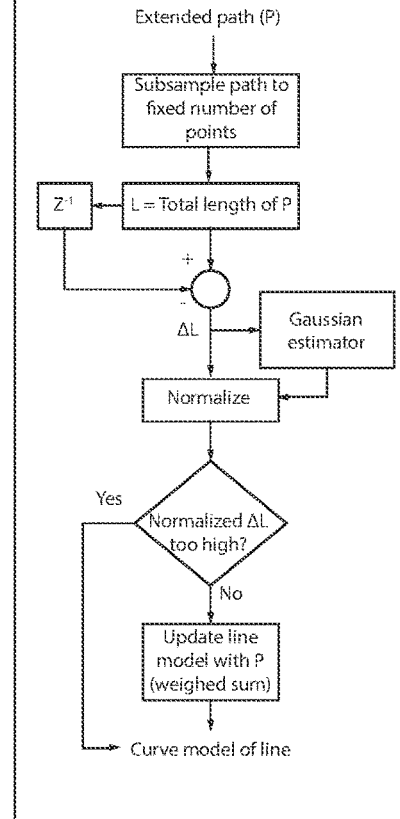

With reference to FIG. 4, the second stage infers which areas from the first step actually conform to the waiting line, rejecting any other surrounding activity. The waiting line segmentation finds the activity contours from the previous block and determines which of them actually belong to the waiting line. The algorithm needs a manually-defined area where to look for the line head. The line head is at the point towards which people in the line are waiting to access and is composed by the people that are about to access. If such line head is found, the rest of the line's first segment is found by fitting a curve model. Then, if the line has discontinuities due to the gaps between the people or occluding objects, any other potential line fragments are sought and included in the model. Finally, a longer-term line model is updated with the line found in the current frame, in case that the observation is not too noisy.

There can be situations in which the image of the waiting line has gaps. This can be due to people standing too far from each other or because the line passes behind occluding objects, like trees or light poles. To cope with these situations, contours that lay after the line's first contour end point are sought. If they meet the certain conditions, they are appended to the line's tail, the end point is updated and the search process is repeated until no more potential line contours are found.

Referring to FIG. 4 in more detail, the process of waiting line segmentation starts with the activity contours as input. Then the operation (2.1) find line first contour is completed producing an input that is run through the operation (2.2) find optimal path from start point over contour. The output of this operation is run through operation (2.3) to extend path from end point of first contour over fragmented contours. The output of (2.3) is run through the operation (2.4) update line model which creates two outputs being the curve model of line and the line contours.

The operation (2.1) find line first contour starts with the input activity contours. The activity contours are run through the operation to find contours that touch the user-defined line start box. The output of the operation is then sorted to find the one with the largest area. The output from this is the line first contour.

The operation (2.2) find optimal path from start point over contour uses the input line first contour. The line first contour is processed to extract the contour curvature. The output of this is run through a low-pass filter curvature. After the filter the curvature local maxima is found. The output results then provide the path over the contour between start point and a local maxima that maximizes the benefit score B. The output of this process is the optimal curve model.

The operation (2.3) extend path from end point of first contour over fragmented contours operates by taking the optimal curve model as an input. The end point of the optimal curve model is then found. Then the derivative at local interval around optimal curve end point is found. The next operation is the initialization step for an iterative process, where the current line first contour is stored in S, all other contours are stored in R, and the curve end point is added as the first element of the path set P, this first element is represented by assigning subscript index i to zero. The iterative process will go through all contour elements N in R that are close to the current line first contour S and do not imply a subtle turn, these two decisions are made also based on the input threshold maps. Threshold maps are also an input at this part of the process. The output is then analyzed for two outcomes: if size of N=0 then the extended path (P) has been found; and if size of N=0 is not true then S=N, remove N from R. This process recalculates the average of all elements in N of the element's farthest point from the current optimal curve end point. The derivative is then updated with this estimated average. The current optimal curve end point then equals the point of contour in N whose projection is highest over the derivative. The output of this process then added to the extended path P, then iteration of the calculation of N using threshold maps takes place.

The operation (2.4) update line model starts with the input extended path (P). The path is subsampled to a fixed number of points. Subsamples are used to find the total length of the extended path (P) which is subtracted from its inverse, yielding a delta L which is input to a Gaussian estimator and that is used for normalization.

If normalized delta L is determined to be too high, then the curve model of the line has been found. If normalized delta L is not determined to be too high, the line model is updated with P before outputting the curve model of the line.

Figure 5:
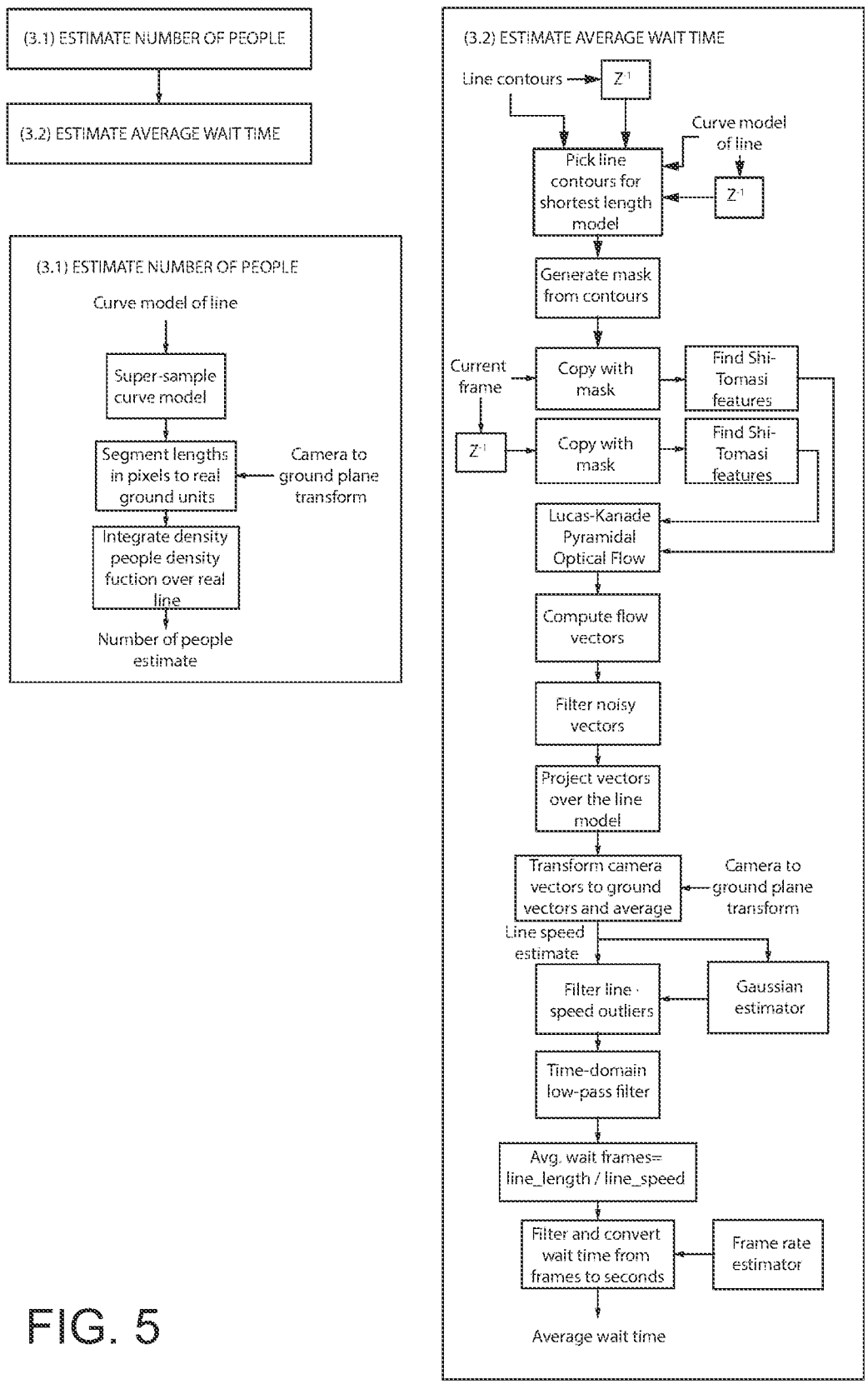
FIG. 5 is a flow diagram showing more detail of deriving measurements of attributes from video data according to an embodiment.
Figure 6:
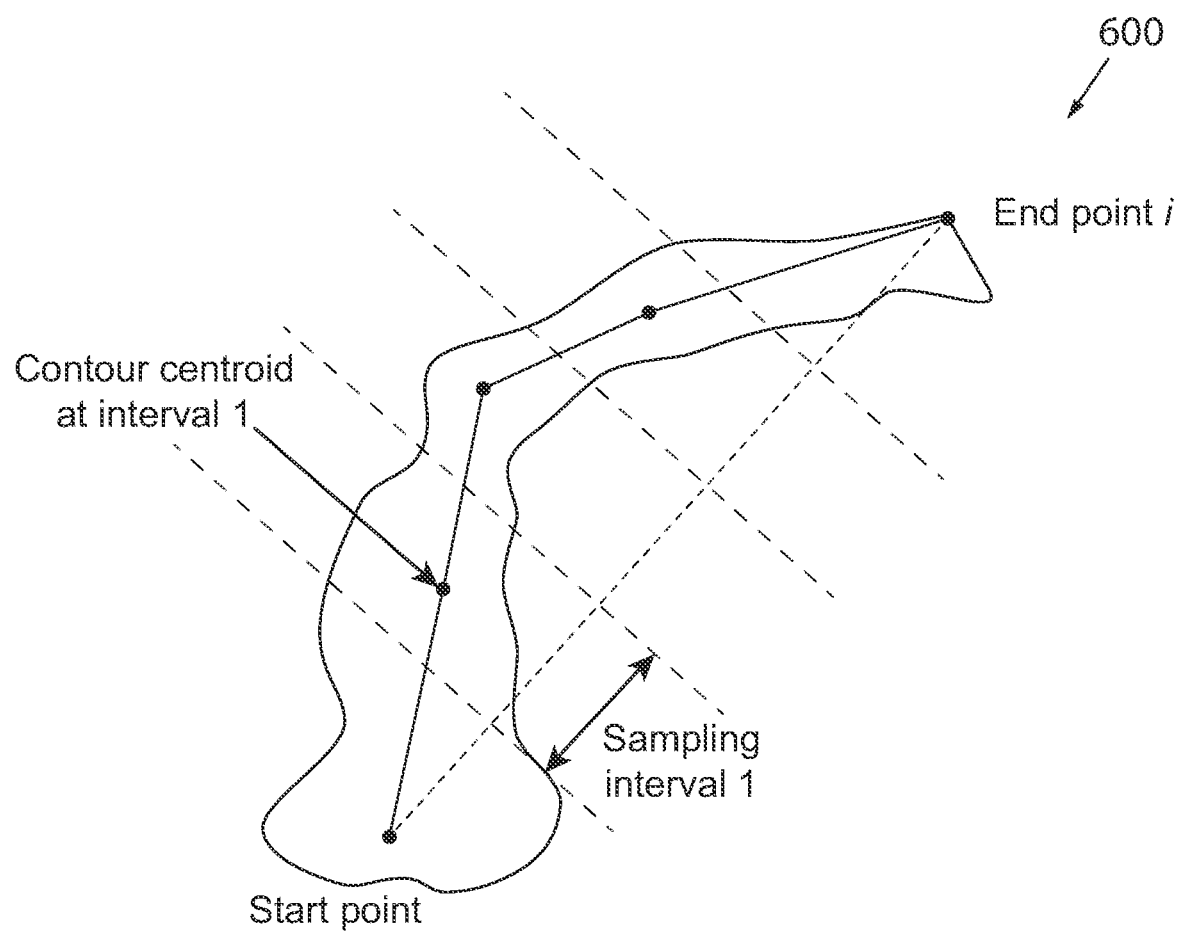
FIG. 6 is a diagram illustration of segmentation of a waiting line from video data according to an embodiment.

With reference to FIGS. 5 and 6, the third step estimates the line attributes of interest. There are currently two attributes that can be measured for a waiting line: the number of people in the line and the average wait time. The number of people is estimated from the line length with a heuristic people density function. The wait time is inferred from the line length and an estimation of the average line speed.

The estimation of the number of people that wait in the line is the line integral along the line model of a people density function. Since the density function variable is a distance over the ground plane, a transformation from image pixels to ground plane distance units must be applied first. The transformation is pre-computed for the specific camera intrinsic and extrinsic parameters. The density function is numerically integrated and, therefore, a first super-sampling step is required to ensure proper accuracy of the result.

In low quality video footage, it is sometimes impossible to distinguish individual people, so tracking waiting persons to know the time that it takes to travel the whole line is usually not viable. Instead, this approach to estimating the average wait time consists in dividing the line length by the average line speed. The line speed is estimated by computing the optical flow of a set of salient points into the line contours over each pair of consecutive frames.

The salient points are found by running the Shi-Tomasi corner detector [1] over the line contour areas. The optical flow is computed with a pyramidal version of the Lucas-Kanade algorithm [2]. Noisy flow vectors—those with impossible speeds for a person walking in a line—are removed from the resulting set. When dividing the line length by the average speed, the resulting wait time is a number of frames. This figure depends on the camera frame rate. The conversion to seconds is achieved by dividing the result by the camera frame rate. Since the system has to deal with variable frame rate video streams, there is a frame rate estimator block that provides this measure.

Referring to FIG. 5 in more detail, some of the many attributes that can be estimated include 3.1 an estimate of the number of people, and 3.2 an estimate of average wait time. To estimate the number of people, the curve model of line is super-sampled and the output lengths are segmented in pixels to real ground units using a camera-to-ground-plane transform. The density of people function is integrated over the real line, yielding the estimate of the number of people.

Referring to 3.2, the average wait time is estimated by transforming the line contours and picking contours for shortest length model, also using a transform of the curve model of the line. Mask contours are generated from the contours. Then a copy with the mask (using the current frame) is used to find Shi-Tomasi features in this masked frame. Also, an inversed transformed copy with the mask (using the transformed current frame) is used to find Shi-Tomasi features the Shi-Tomasi features in the second copy. Shi-Tomasi features from both copies are inputs to the Lucas-Kanade Pyramidal optical flow the input is provided to compute flow vectors. Then noisy flow vectors are filtered out and resulting vectors are projected over the line model.

Using a camera-to-ground-plane transformation, then the camera vectors are transformed to ground vectors and averaged, yielding a line speed estimate which is filtered for line speed outliers both with and without being run through a Gaussian estimator. The filtered line speed is run through the time-domain low-pass filter to obtain average wait frames (line_length divided by line_speed). The average wait frames are then filtered and converted from frames to seconds using a wait frame estimator, to yield an average wait.

Additional Data Algorithms

Queue Time Estimation

FIG. 6 is an illustration 600 of sampling data for queue time estimation according to an embodiment. Between start point and end point sampling intervals are predetermined as shown. During sampling interval 1, for example, a contour centroid (along the heavy line indicating a generally central physical location of the objects that generate data to be sample is calculated The lighter line surrounding the area of the heavy line indicated the range of physical locations of such objects.

Figure 6A:
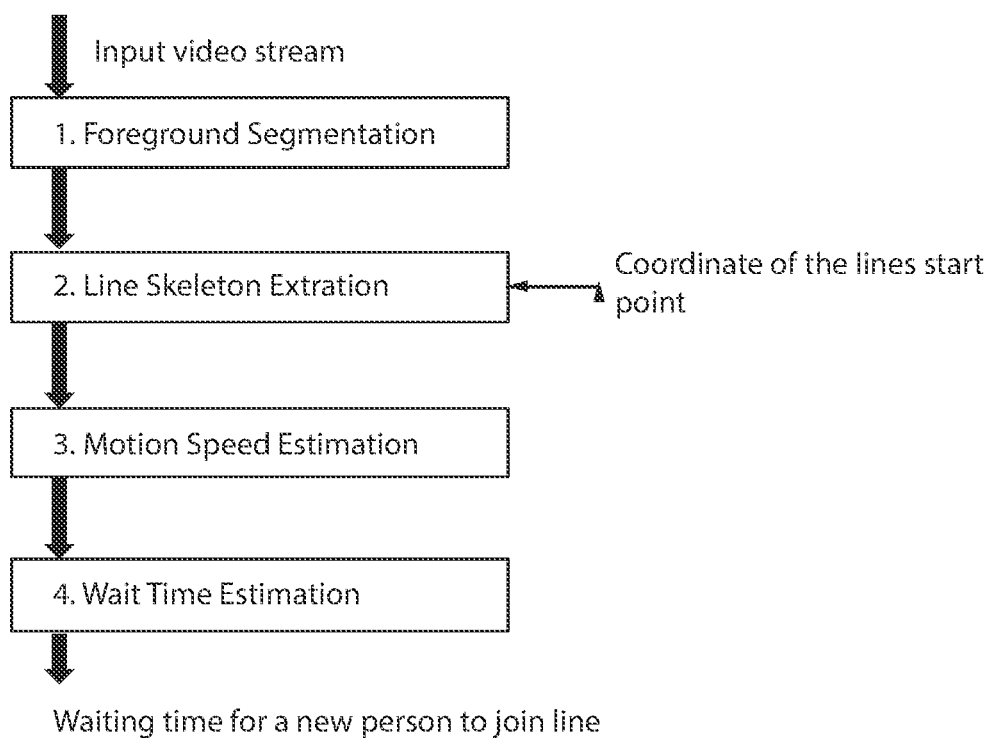
FIG. 6A is a flow diagram of a queue time estimation method according to an embodiment.

Referring to FIG. 6A, in various embodiments herein, queue time estimation is the idea of using video streams from a static camera to detect queueing lines and estimate the queueing time required for the next person to join the queue.

This algorithm assumes a static camera is looking at a line with a static end point but potentially varying starting points or shapes of the line itself.

The goal is to estimate wait time in the line.

In an embodiment, the method includes three main modules: foreground segmentation, queueing line construction, and queueing time estimation.

A foreground segmentation module (1) builds a background model from a static video stream (see also the discussion of object detection and tracking section) and segment out all foreground blobs in the scene.

A queue skeleton extraction module (2) constructs a line model based on consistency in shape and orientation of connected foreground blobs for each pre-selected start point of the queue. One approach used to define the line is a mathematical morphology skeleton extraction. It could also be a B-spline approximation or any other algorithm that extracts the center line of a surface.

Unrelated foreground in the scenes are removed while discontinued foreground blobs of the line are added, both calculated based on their consistency with the line model. Once the line skeleton is extracted, we can compute line length (in pixels), line areas.

A motion speed estimation module (3) receives the output of the line skeleton extraction module (2). This module estimates the speed of the line in pixels/second, at each point of the line. By using a standard tracking algorithm such as salient point and local feature tracking, gradient descent tracking, or video flow, we can compute image motion in the line area. We can then project each estimated motion vector onto the line skeleton, using a perpendicular projection. Each project gives an indication of speed along the line. By averaging out all samples along the line, and filling empty areas with linear interpolation, we can estimate the speed of the line at any point of the line skeleton. Samples need to be regularly spaced to get a good estimation.

Wait time estimation (4) estimates how long someone would wait in line if they joined the line now. Now that we have a speed estimate at each point of the line, in pixels per seconds, all we need to do is divide the distance between two pixels of the skeleton by the average speed between these two pixels. We define a sampling step S and start at the first pixel of the line, using this pixel (index n) and the n+S pixel to measure the estimate. We add up estimates until the second index reaches the end of the line.

Figure 7:
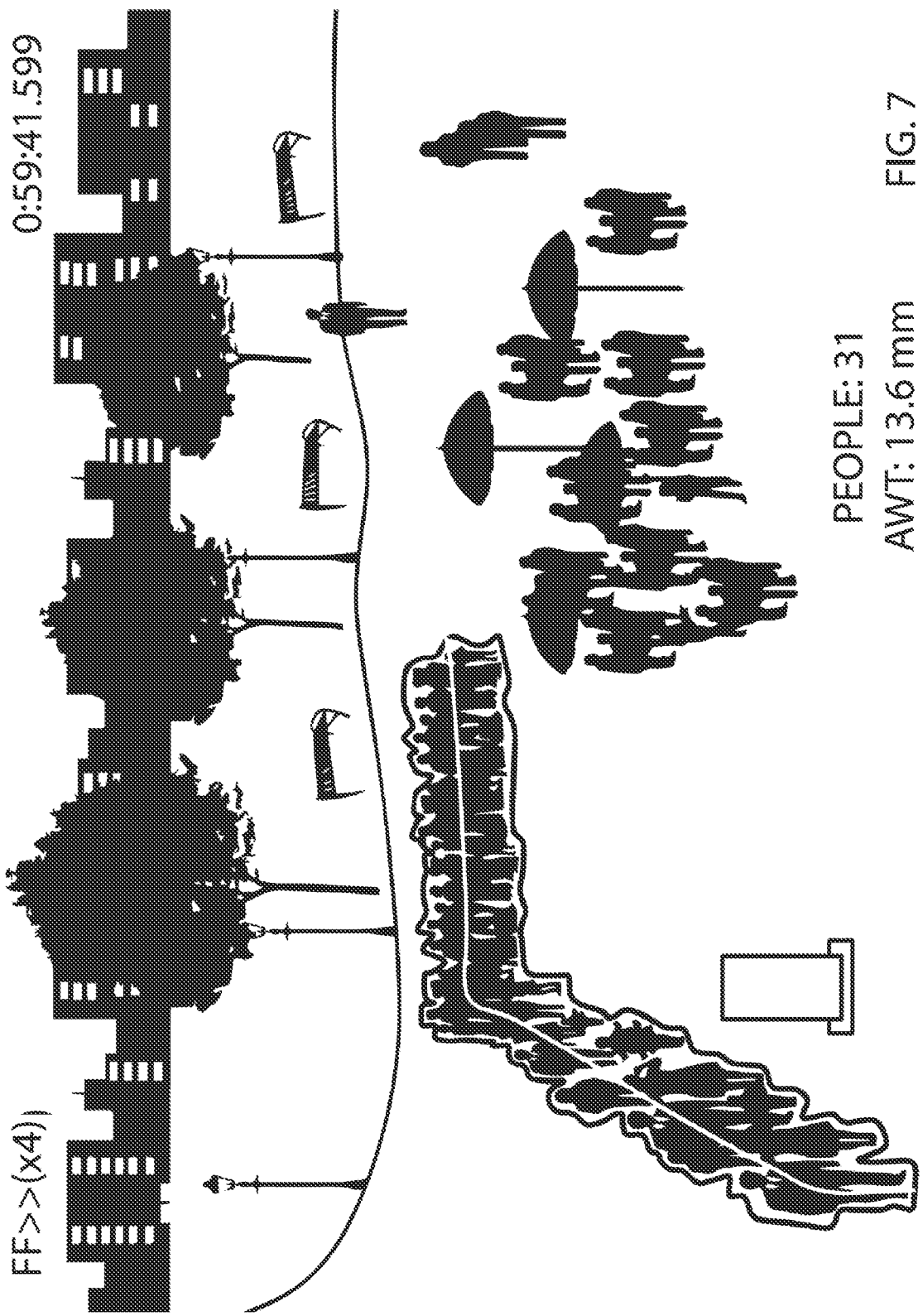
FIG. 7 is shows a user interface display with a waiting line as captured by a video camera with currently calculated attributes imposed on the image.

FIG. 7 is shows a user interface display with a waiting line as captured by a video camera with currently calculated attributes imposed on the image.

Automated segmentation of urban scenes: by analyzing where, on average, people or vehicles or bicycles are located in an image we can automatically detect where sidewalks, roads, bike routes and road crossings are.

Using the same algorithms as the ones described above, we have trajectory information about different types of elements of urban scenes. We focus on pedestrian, vehicles, public transportation vehicles, bicycles. By adding up all trajectories in a map of the video feed (pixels corresponding to the video feed pixels) we can have a map of where each type of elements moves and is in the image. If it is pedestrians, these areas will be mostly sidewalks, crossroads, parks, plazas. If it is vehicles, it will be roads. For bicycles it will be bicycle lanes. If we detect both vehicles and pedestrians at non overlapping times, this will be crosswalks.

This map will be quite accurate even if the detection and classification of objects is not very accurate. We typically can work with detectors that have a <10% false positives rate and >50% detection rate. Using this approach we can automatically build a map of the image, thus improving classification results. We can indeed either post process detection scores based on this map—a pedestrian detection score in a sidewalk area will be increased, decreased in non-classified areas (buildings, sky, . . . ). Or we can adjust algorithm parameters based on image location—a prior optimization approach as opposed to the posterior approach described right before.

Analyzing the scene viewed by a static camera that runs the algorithms previously described has several positive impacts:

1. reducing noise: if we know where streets and sidewalks and crosswalks are we can eliminate any detection that is not an expected object—too big or too fast for one of the expected objects for example. We can also remove all detections outside of these zones.

2. automating setup: if we can automatically detect streets, sidewalks, crosswalks and entrances of buildings, we can automatically set turnstiles or building entrances to start counting people there, without any manual intervention.

3. camera calibration: if we know what type of objects are on average in a given zone, we can estimate calibration of the camera by comparing the expected surface of that object, based on speed angle, with the real life estimated size of this object. We can create a map where each pixel contains its estimated dimensions in actual dimensions, in meters.

The output for this scene analysis is: a set of scene "flows" or zones that are zones where one type of object is in majority; the type of object for these zones; the average surface and speed of an object at each point of this zone.

In order to get to this scene analysis, an embodiment uses the following algorithm components:

1. Trajectory computation over a long period of time: Using the same algorithms as the ones described above, we have trajectory information about different types of elements of an urban scene. We let this algorithm run on enough video coming from this scene to extract a minimum of T trajectories of objects.

2. Trajectory clusterization using a DBSCAN variant: DBSCAN is an algorithm to clusterize points. We transpose it literally to classify trajectories. For that we define a trajectory distance that is computed as follows:

we consider trajectories A and B for each point in A, find the closest point in B distance for that point is the euclidean distance of the two points, combined with the angle difference between the two points, combined with the surface difference between the two points. Not that we don't use the speed norm difference, just angles. Combination can be harmonic or linear.

we compute point distance for each point in trajectory A, then add them up and divide the result by the number of points in A.

we then do the opposite, starting with B the final distance is the maximum of the two distances some variants are possible in the combination of all point distances: e.g. take the 50% lower distance points. Or do not divide by the number of points.

The output of this trajectory-DBSCAN algorithm is a set of groups of trajectories that fit together.

Then, for each cluster, we use these trajectories to compute a map for a "scene flow", or group of trajectories. We first compute a mask of all pixels where there is a trajectory point, or that sits on a line between two consecutive points. We dilate this mask by a radius r—using morphological dilation using a square structuring element.

For each point of this mask, we look for trajectory points that are on the same coordinates. We compute an average and standard deviation for all these points, of the following measures: mask surface, mask width, mask height, speed norm average, speed norm standard deviation, speed angle average (−90 to 90 degrees) and speed angle standard deviation.

Once direct points are computed we go through all points in the mask that do not have a value and compute a value by spatial interpolation. In one embodiment, bilinear interpolation is used.

3. Ad-hoc or advanced cluster classification: Once we have all these clusters, what type of objects they contain in majority is to be determined. There are two approaches to that: ad-hoc and object class approaches.

Object class approach: if the resolution of the image is good enough to run a cascade classifier such as described above, we can get an estimated class for each object of each trajectory. We then take the majority class over the mask of the flows as described above, and assume this majority class is the main class of this flow. We do this for each flow above.

Ad-hoc approach: if we assume we have two classes, one being vehicles and one being people, we can assume that there are two classes of sizes for flows in the image. We have to keep in mind that we can have strong perspective effects, so only neighboring points can be compared to see if the objects they contain are larger or smaller than each other. If objects are too far away, the perspective effect might supercede actual object size. So for each flow, we consider all of its contour points. For each contour point, we look for immediate neighbors that in other flows. If we find some, that are closer to a distance D, we can compare average object dimensions between that point and its immediate neighbors. If we find enough examples where the starting point is much larger, by a factor T, than the neighbors, we can tag the point as a "large" point. If we find enough points where the starting point is much smaller, with a factor S, we can tag the starting point as "Small". Over one contour of a flow, if more than a given percentage P of points are "large", we tag the flow as vehicles. Over one contour of a flow, if more than a given percentage Q of points are "small", we tag the flow as pedestrians. Otherwise we leave it untagged.

4. Calibration map: Once all flows are tagged, we can start building the calibration map. Take all flows with a tag. For each point of the flow, consider the average surface, width and height, expressed in pixels, of an object.

Now consider the typical width, height and depth of a person or a vehicle. This can depend on geographies—in some places average people are smaller, in some places vehicles are larger. We can compute a projection model where based on this 3D model of an object and the observed motion, we can estimate the expected width, height and surface of the projected object expressed in meters.

Now for each point of the flow, we can compute the ratio of square meters per square pixels for an object. By taking the square root of that number and dividing it by sqrt(2.0) we get the estimated dimension of a pixel (width and height), expressed in meters.

A post processing to remove noise such as median filter can be useful to clean up the signal. A variant is to also use the width and height in pixels and in meters to have two other estimates of that pixel dimensions, and then average out or median filter the three estimates.

5. Speed/dimensions estimation: Now that we have an estimation of the real life dimensions of a pixel, we can estimate real life dimensions and speeds of objects. We just have to multiply the dimensions in pixels by the meter to pixel ratio of the calibration map. An alternative is to use geometric angles to fine tune this estimate—if the angle is 45 degrees the real life speed is (speed in pixels/sec)×(meter/pixel ratio)*cos 45. If angle is 0 or 90, the real life speed is (speed in pixels/sec)×(meter/pixel ratio).

Object Detection and Classification.

Figure 8:
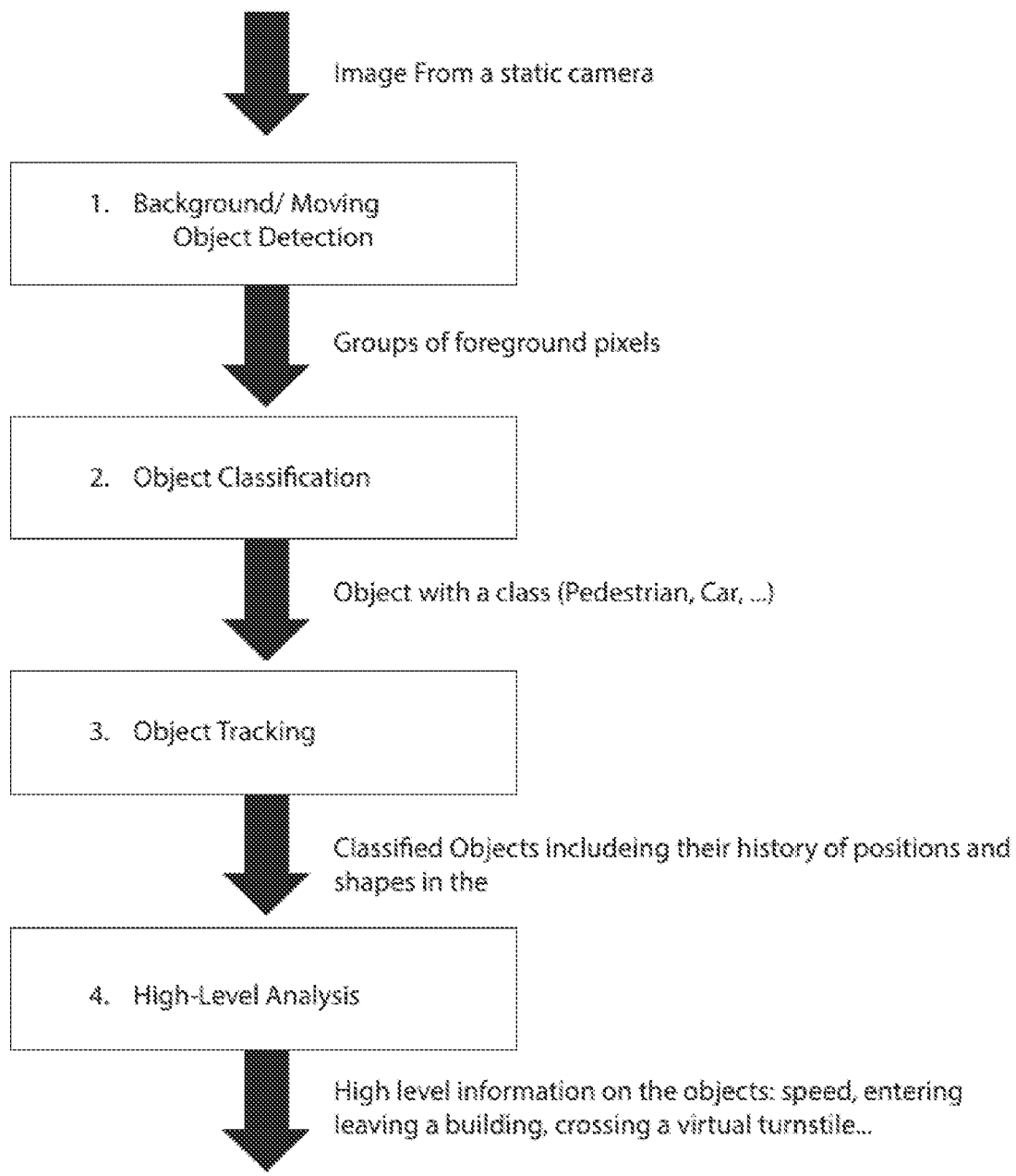
FIG. 8 is a flow diagram of an object detection and classification method according to an embodiment.

FIG. 8 is a flow diagram of a process of object detection, classification, object tracking and analysis according to an embodiment. With reference to FIG. 8, embodiments of video algorithms detect and track foreground objects from static cameras and infer high level information such as object count and speed in real-time. They are based on a four-layer stack: object detection, classification, tracking and analysis. These algorithmic layers are based on the assumption that video feeds have a mostly static viewpoint and a frame rate greater than 0.2 frames per second.

A background/moving object detection process (1) takes as input an image from a static camera. Process (1) outputs groups of foreground pixels and a dynamic model of the background.

A goal of this layer is to detect moving objects or moving parts in the image. It is based on estimating the background image of a fixed video stream, by modeling each point using a Gaussian distribution of values on each channel of a color image, or the amplitude of the combined channels. For color images, the value of each channel is modeled as a Gaussian distribution. The Gaussian model, defined by its 0 and 1 moment, or mean and variance, is created and stored in memory for each coordinate point of an image.

In order to determine if a pixel p is part of the background or foreground, we compute a normalized distance metric of a pixel to the background value as the linear combination of the normalized distance for each channel. A normalized distance for a channel is defined as the absolute distance from the pixel channel value to the background value, divided by its standard deviation.

$$d(i)=(v(i)-b(i))/\text{sigma}(i)$$

where (i) is the channel index, v the current pixel channel value, b the background channel value and sigma the current estimate of the background channel value standard deviation.

$$D=d(0)+d(1)+d(2) \text{ if the image is a 3 channel color image.}$$

As new frames arrive in the system, we first compute the normalized distance of this pixel to the current background Gaussian model. If the value is less than a first threshold T1, we consider the pixel as part of the background and update the Gaussian model for this coordinate point with the current pixel values.

If the value is greater than T1, we create a new model for a new background candidate. Things might have changed in the image and we need a new background candidate to adjust to these changes. If there are already some background candidates available, we first compute distances of the current pixels to other candidates. If any distance is less than T1, we update the best matching candidates (the one with the lowest distance) with the current value. If no match was found, we create a new candidate.

If a candidate was not updated for a given period of time S, we cancel the background candidate.

Each candidate has a lifetime span, that is equal to the time elapsed between its creation and its last update. The lifetime span cannot be greater than a parameter E called eternity.

$$LS=\text{MIN}(E,t(\text{updated})-t(\text{created})).$$

If any of the candidate backgrounds has a longer lifetime span than the current background, we cancel the current background value and replace it with the new, longer lifetime value. This helps the model adjust to rapid background changes.

If the distance metric is greater than a different factor T2, we mark the pixel as being part of the foreground.

In order to adjust the Gaussian values to potential changes in the mean and standard deviation, we estimate all Gaussian model values over overlapping time windows. In order to reduce the complexity of computing all values over moving averages, we use a half-overlapping scheme. If M is the minimum window size (number of samples) over which we want to estimate Gaussian models, we constantly store two sets of overlapping sums and square sums: the current sum set and the future sum set. Each set stores the number of samples and the sum of values and the sum of square values that help compute mean and variance. When the first set reaches M samples, we reset the second set and start updating it with each new frame. When the first set reaches M*2 samples, the future set reaches M samples. We then copy the future set values into the current set values, and reset the future set. This way, at any point in time after M first samples, we always have an estimation of the Gaussian model that has more than M samples, and adjust over time windows of M*2 samples. M is typically set to values ranging from 10 to 1000 depending on applications and video frame rates. As a result, outside of the starting period where we have less than M samples processed in total, all our Gaussian model estimates rely on at least M samples.

In order to reduce computation cost, we can subsample the image spatial reference by a factor P. Also, we can subsample the time reference by another factor Q—we update the background statistics only once every Q frames. This reduces the number of operations needed significantly. However, the foreground estimation cannot be subsampled, so complexity is only reduced for background estimation. This is very efficient to make the algorithm real time whatever the dimension or frame rate of a video. The CPU occupancy of such a process is controlled and defined with these two parameters. This is a unique way to linearly adjust algorithm reactivity and accuracy based on available or desired computation power.

An object pixel classification process (2) takes as input groups of foreground pixels. The output is one or more objects per group with an associated class.

The goal of this layer is to classify foreground described from process (1) above into classes of known objects or "noise". In an embodiment, a customized version of the ADABOOST Cascade approach is used.

Once we have detected all moving objects we classify them using a classic supervised learning approach, based on the ADABOOST Cascade classification (described in Viola and Jones P. A. Viola, M., and J. Jones: Robust Real-Time Face Detection. ICCV 2001).

Embodiments of the method train, test and run the algorithm only on moving objects, thereby reducing the possibilities and variety of the training and input sets of images. In short our classification scheme only needs to recognize moving urban objects from each other, as opposed to recognizing one type of object from any other possible matrix of pixels.

This step also helps separate groups or aggregates in some cases—if a car and pedestrians are close to each other and detected as the same object, we will be able to detect them separately in many occasions, thus splitting the original object in two separate objects.

An object tracking process (3) takes as input an instance of one object at one point in time, with or without associated class. The output is a linked appearance of the same objects at different times, with trajectory and shape over time.

The goal of this layer is to connect the occurrence of the same object in consecutive frames so as to understand the object's movement in the image.

At each new frame, we try to match new foreground objects with existing, connected objects tracked in prior iterations, or if no match is found, we create a new object. We use a combination of shape, predicted position based on previous motion, and pixel content, to do the matching.

An object trajectory analysis and classification process (4) takes as input objects with trajectories, and outputs high level information on objects.

The goal of this layer is to use the type and trajectory information to detect higher level, human readable data such as vehicle or pedestrian speed, and people entering or exiting a location. We can also infer on the building layouts based on traffic flows of pedestrians and vehicles.

Using the same algorithms as the ones described above, we have trajectory information regarding different types of elements of urban scenes. For this data analysis, the focus is on pedestrian, vehicles, public transportation vehicles, bicycles. By adding up all trajectories in a map of the video feed (pixels corresponding to the video feed pixels) we can have a map of where each type of elements moves and is in the image. If it is pedestrians, these areas will be mostly sidewalks, crossroads, parks, plazas. If it is vehicles, it will be roads. For bicycles it will be bicycle lanes. If both vehicles and pedestrians are detected at non overlapping times, this will be crosswalks. This map will be quite accurate even if the detection and classification of objects is not very accurate. Embodiments typically work with detectors that have a <10% false positives rate and >50% detection rate.

Using this approach a map of the image is automatically built up, thus improving classification results. A post process detection scores can be posted based on this map—a pedestrian detection score in a sidewalk area will be increased, decreased in non-classified areas (buildings, sky, etc.). Or the algorithm parameters can be adjusted based on image location—a prior optimization approach as opposed to the posterior approach described right before.

Automated detection of building entrances using trajectories: areas where many trajectories start or end are likely to be building entrances.

The recognition and tracking algorithms described above are able to detect, recognize and track the trajectories of pedestrians, vehicles, and other types of urban elements. Based on the output of this algorithm, we are able to detect starting points and ending points of people or vehicles. We can detect areas of the video streams where more people or vehicles start or end their trajectories over long periods of time—typically 24 hours are required. These areas, when not on the border of the video streams, are areas where these elements appear or disappear.

Some of these areas will be areas of occlusion—a tree canopy, a large object hiding the view, etc. In such cases there are clear borders to the start and end points of trajectories and no trajectory will start or end, at all, where the occlusion is.

In cases where trajectories appear or disappear in a more scattered and distributed way, we probably are seeing a building entrance.

In order to automatically detect building entrances or exits, we represent all starting or ending points of trajectories on a map of the video stream. Then we run a local window analysis of the geographic distribution of these points. We can either use moments or simply cross point distance, or even principal components analysis. Moments and distances have proven to be great indicators of building entrances. This is extremely valuable to detect building entrances automatically and also valuable to start counting people coming in and out. Every trajectory starting in that entrance area will count as one person exiting the building. Every trajectory ending there will count as a person entering the building. By counting these entrances and exits continuously, statistically correcting numbers for detection errors, we can get to a real time count of occupancy and traffic in a given location. This is valid for people, cars, any type of vehicles.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system include: microcontrollers with memory (such as electronically erasable programmable read only memory (EEPROM)), embedded microprocessors, firmware, software, etc. Furthermore, aspects of the system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the internet and/or other computer networks via one or more data transfer protocols (e.g., HTTP, FTP, SMTP, etc.). When received within a computer system via one or more computer-readable media, such data and/or instruction-based expressions of components and/or processes under the system described may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

While certain aspects of the systems and methods are presented below in certain claim forms, the inventors contemplate the various aspects of the systems and methods in any number of claim forms. For example, while only one aspect of the systems and methods may be recited as embodied in machine-readable medium, other aspects may likewise be embodied in machine-readable medium. Accordingly, the inventors reserve the right to add additional claims after filing the application to pursue such additional claim forms for other aspects of the systems and methods.

What is claimed is:

1. A computer-implemented method for object detection from video data having rapid background changes, the method comprising:
 a special purpose processor collecting video data from a plurality of dissimilar sources;
 the special purpose processor, in an iterative process, defining known foreground objects and newly emerged objects;
 the special purpose processor determining moving objects from the video data, wherein determining moving objects comprises estimating the background image of a fixed video stream, comprising modeling points in the video data using a Gaussian distribution of values on each channel of a color image, wherein at least one candidate pixel is identified in the background image for adapting to rapid background changes, determining a lifetime of the at least one candidate pixel as the time elapsed between the creation and the last update of the candidate pixel, and replacing a current background value with a candidate pixel value having a longer lifetime than the current background value, and wherein determining moving objects further comprises, movement detection comprising at least one non-linear time-domain high-pass filter;
 foreground detection comprising, finding an absolute difference of a current frame and an expected background, adding R, G, B planes with saturation, and merging the absolute difference with the expected background to determine a binary threshold;
 updating a background model; and
 contour extraction comprising generating activity contours;
 the special purpose processor classifying the moving objects from the video data, wherein classifying moving objects comprises receiving groups of foreground pixels and outputting one or more objects per group with an associated class using class supervised learning, and wherein classifying comprises classifying moving foreground objects into one of a plurality of classes of known objects and "noise";
 the special purpose processor tracking the moving objects from the video data wherein tracking comprises receiving as input an instance of one object at one point in time and calculating its trajectory and shape overtime, and for each new video frame attempting to match foreground objects with existing objects tracked in prior iterations of the iterative process, and determining where the moving objects start and end their trajectories over a period of time; and the special purpose processor processing the video data as video streams from the plurality of dissimilar sources, providing video data of different types, to allow the video data from the plurality of dissimilar sources to be analyzed without dependence on a source of any of the video data.

2. The method of claim 1, further comprising the special purpose processor:

representing all starting points and ending points of trajectories on a map of the video streams; and performing a local window analysis of a geographic distribution of the starting points and ending points.

3. The method of claim 1, wherein the video data comprises a plurality of images, and wherein the image data is subsampled by an integer factor to facilitate processing speed.

4. The method of claim 1, wherein the video data comprises a plurality of images, and wherein determining moving objects comprises determining background statistics, wherein background statistics can be updated at variable intervals to affect different processing speeds.

5. The method of claim 1, wherein tracking the moving objects comprises receiving an instance of an object at a point in time and outputting a linked appearance of the same object at different times, with trajectory and shape over time.

6. The method of claim 1, wherein analyzing the video data comprises receiving objects with trajectories and outputting information regarding the objects, comprising speed of objects, objects entering or leaving a location, and inference of building layouts based on movement of objects.

7. A non-transient computer readable medium having stored thereon instructions, that when executed by a special purpose processor cause a method for activity monitoring to be performed using video data having rapid background changes, the method comprising:

a special purpose processor collecting video data from a plurality of dissimilar sources;

the special purpose processor, in an iterative process, defining known foreground objects and newly emerged objects (foreground detection), foreground detection comprising, finding an absolute difference of a current frame and an expected background, adding R, G, B planes with saturation, and merging the absolute difference with the expected background to determine a binary threshold;

the special purpose processor determining moving objects from the video data, wherein determining moving objects comprises estimating the background image of a fixed video stream, comprising modeling points in the video data using a Gaussian distribution of values on each channel of a color image and wherein at least one candidate pixel is identified in the background image for adapting to rapid background changes, determining a lifetime of the at least one candidate pixel as the time elapsed between the creation and the last update of the candidate pixel, and replacing a current background value with a candidate pixel value having a longer lifetime than the current background value;

the special purpose processor classifying the moving objects from the video data, wherein classifying moving objects comprises receiving groups of foreground pixels and outputting one or more objects per group with an associated class using class supervised learning, and wherein classifying comprises classifying moving foreground objects into one of a plurality of classes of known objects and "noise";

the special purpose processor tracking the moving objects from the video data wherein tracking comprises receiving as input an instance of one object at one point in time and calculating its trajectory and shape overtime, and for each new video frame attempting to match foreground objects with existing objects tracked in prior iterations of the iterative process, and determining where the moving objects start and end their trajectories over a period of time;

the special purpose processor determining likely detection of a building entrance based on where the moving objects start and end their trajectories over the period of time; and the special purpose processor processing the video data as video streams from the plurality of dissimilar sources, providing video data of different types, to allow the video data from the plurality of dissimilar sources to be analyzed without dependence on a source of any of the video data.

8. The non-transient computer readable medium of claim 7, wherein the video data comprises a plurality of images, and wherein the image data is subsampled by an integer factor to facilitate processing speed.

9. The non-transient computer readable medium of claim 7, wherein the video data comprises a plurality of images, and wherein determining moving objects comprises determining background statistics, wherein background statistics can be updated at variable intervals to affect different processing speeds.

10. The non-transient computer readable medium of claim 7, wherein tracking the moving objects comprises receiving an instance of an object at a point in time and outputting a linked appearance of the same object at different times, with trajectory and shape over time.

11. The non-transient computer readable medium of claim 7, wherein analyzing the video data comprises receiving objects with trajectories and outputting information regarding the objects, comprising speed of objects, objects entering or leaving a location, and inference of building layouts based on movement of objects.

12. A system for processing multiple video data streams from video data having rapid background changes, comprising:

a plurality of input video data sources;

a backend subsystem configured to receive video data from the plurality of input video data sources, the backend subsystem comprising, a plurality of video analysis workers comprising special purpose processors tasked with executing video analysis worker processes, comprising, in an iterative process, defining known foreground objects and newly emerged objects;

determining moving objects from the video data, wherein determining moving objects comprises estimating the background image of a fixed video stream, comprising modeling points in the video data using a Gaussian distribution of values on each channel of a color image;

identifying at least one candidate pixel in the background image for adapting to rapid background changes;

determining a lifetime of the at least one candidate pixel as the time elapsed between the creation and the last update of the candidate pixel, and replacing a current background value with a candidate pixel value having a longer lifetime than the current background value;

classifying the moving objects from the video data, wherein classifying moving objects comprises receiving groups of foreground pixels and outputting one or more objects per group with an associated class using class supervised learning, and wherein classifying comprises classifying moving foreground objects into one of a plurality of classes of known objects and "noise", wherein classifying comprises foreground detection comprising, finding an absolute difference of a current frame and an expected background, adding R, G, B planes with saturation, and merging the absolute difference with the expected background to determine a binary threshold;

tracking the moving objects from the video data, wherein tracking comprises receiving as input an instance of one object at one point in time and calculating its trajectory and shape overtime, and for each new video frame attempting to match foreground objects with existing objects tracked in prior iterations of the iterative process;

wherein tracing the moving objects comprises tracking moving objects from a plurality of dissimilar sources, which supply video data of different types, to allow the video data from the plurality of dissimilar sources to be analyzed without dependence on a source of any of the video data; and a data analytics module configured to receive processed video data from the plurality of video analysis workers and output human readable information, wherein the human readable information comprises likely locations of building entrances.

13. The system of claim 12, wherein the data analytics module is further configured to access external data sources, including weather data sources, and event information sources.

14. The system of claim 12, further comprising at least one user interface configured to provide the human readable information to a user any computing device with processing capability, communication capability, and display capability, including personal computers and mobile devices.

* * * * *